United States Patent [19]

Yamane et al.

[11] Patent Number: 4,964,066

[45] Date of Patent: Oct. 16, 1990

[54] DEVICE FOR EDITING AND DISPLAYING DATA RECORDED ON SPECIALIZED SHEETS OR RECORDS

[75] Inventors: Yasukuni Yamane; Noritoshi Kako; Yoji Noguchi, all of Nara; Masaki Takakura, Osaka, all of Japan

[73] Assignee: Sharp Kabushiki Kaisha, Osaka, Japan

[21] Appl. No.: 484,465

[22] Filed: Feb. 22, 1990

Related U.S. Application Data

[63] Continuation of Ser. No. 338,553, Apr. 13, 1989, abandoned, which is a continuation of Ser. No. 92,420, Sep. 3, 1987, abandoned.

[30] Foreign Application Priority Data

Sep. 5, 1986 [JP] Japan ................................ 61-210116
Sep. 5, 1986 [JP] Japan ................................ 61-210117
Sep. 5, 1986 [JP] Japan ................................ 61-210118
Sep. 5, 1986 [JP] Japan ................................ 61-210119

[51] Int. Cl.⁵ .................. G06F 15/66; G09G 5/36; G06K 9/00
[52] U.S. Cl. ...................... 364/518; 382/65; 382/69; 235/454
[58] Field of Search ................ 364/518; 382/65, 58, 382/69; 340/706; 235/454, 490

[56] References Cited

U.S. PATENT DOCUMENTS

| 4,554,591 | 11/1985 | Kee | 360/2 |
| 4,589,144 | 5/1986 | Namba | 364/518 |
| 4,736,447 | 4/1988 | Korsinsky | 382/69 |
| 4,752,773 | 6/1988 | Togawa et al. | 340/721 |

Primary Examiner—Gary V. Harkcom
Assistant Examiner—Raymond J. Bayer
Attorney, Agent, or Firm—Flehr, Hohbach, Test, Albritton & Herbert

[57] ABSTRACT

A device for editing and displaying an image uses a medium such as a transparent film or a magnetic card on which are recorded both display data and commands for specifying how the display data should be processed. Such data are received by the device through a camera, a magnetic record reader and/or the like and stored in a memory device. Digital image processing is performed on such stored data according to the commands and an image according to the processed data is displayed.

9 Claims, 20 Drawing Sheets

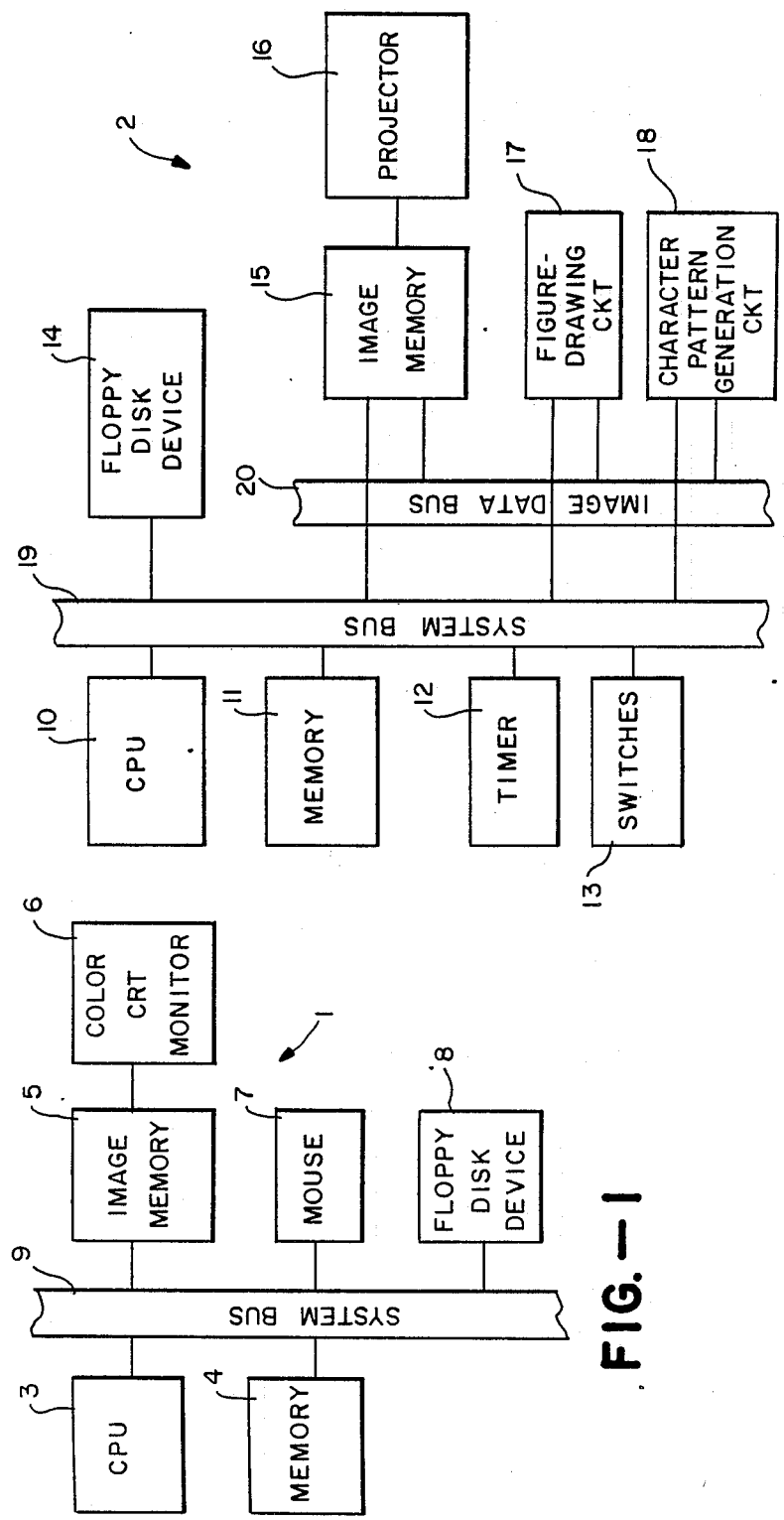

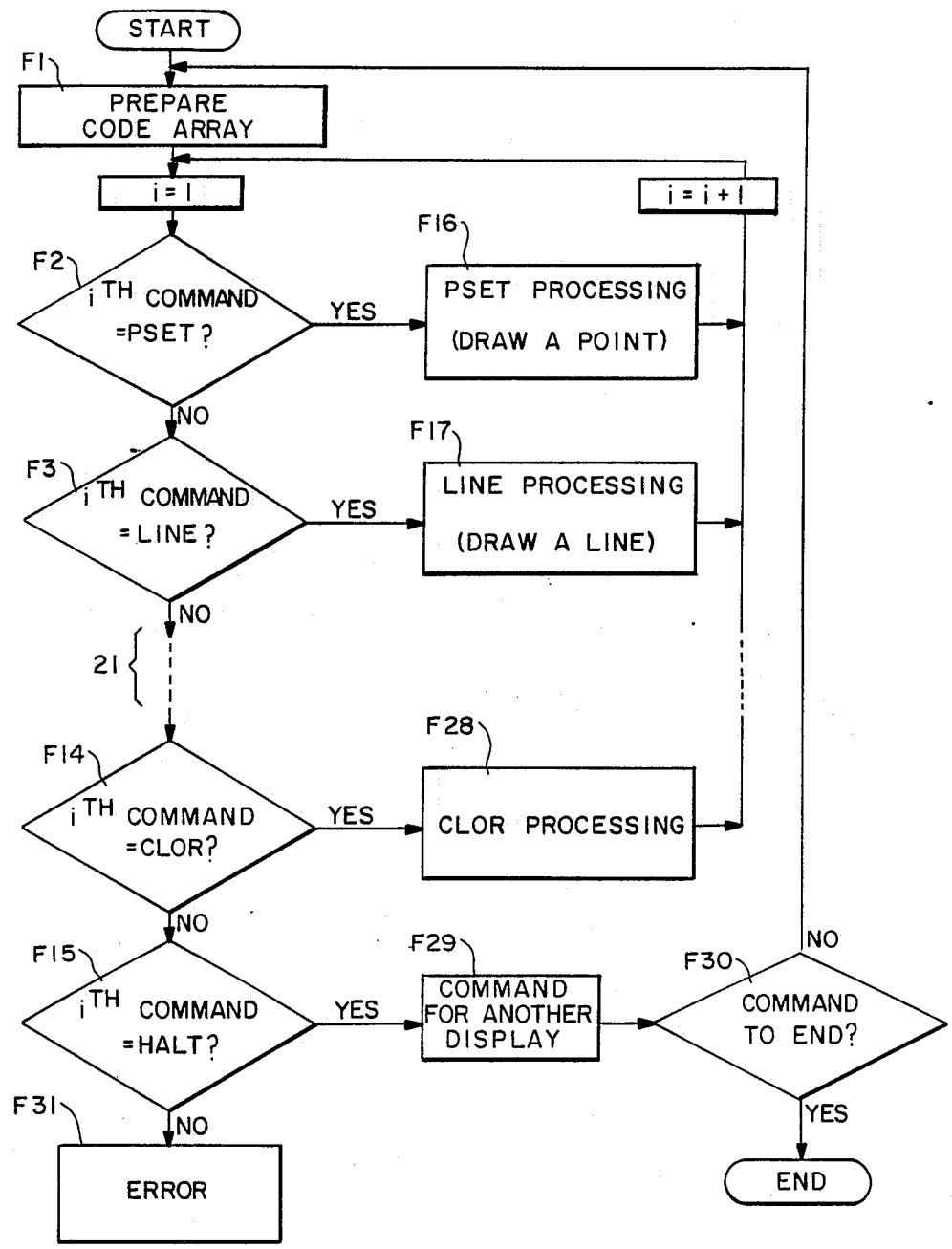
FIG.—4

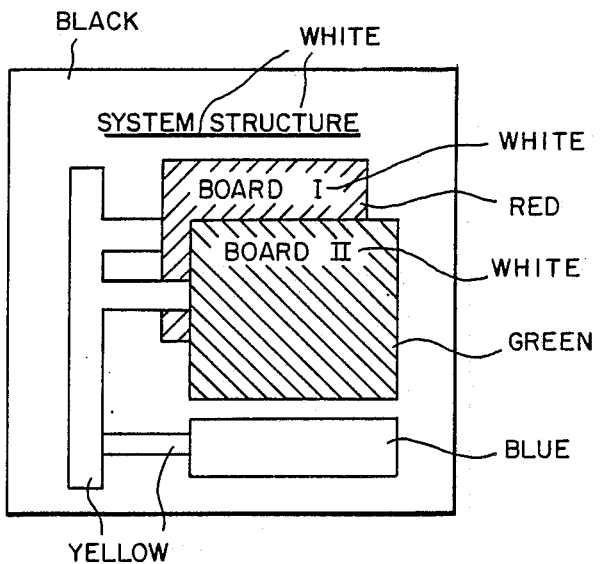
FIG.—7
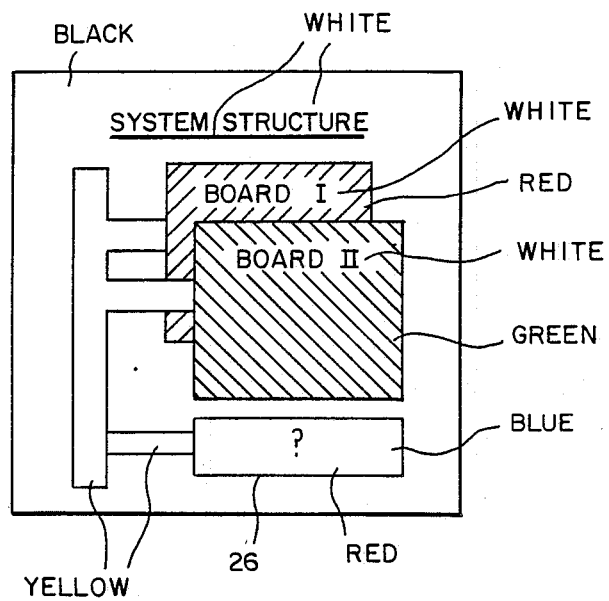
FIG.—8

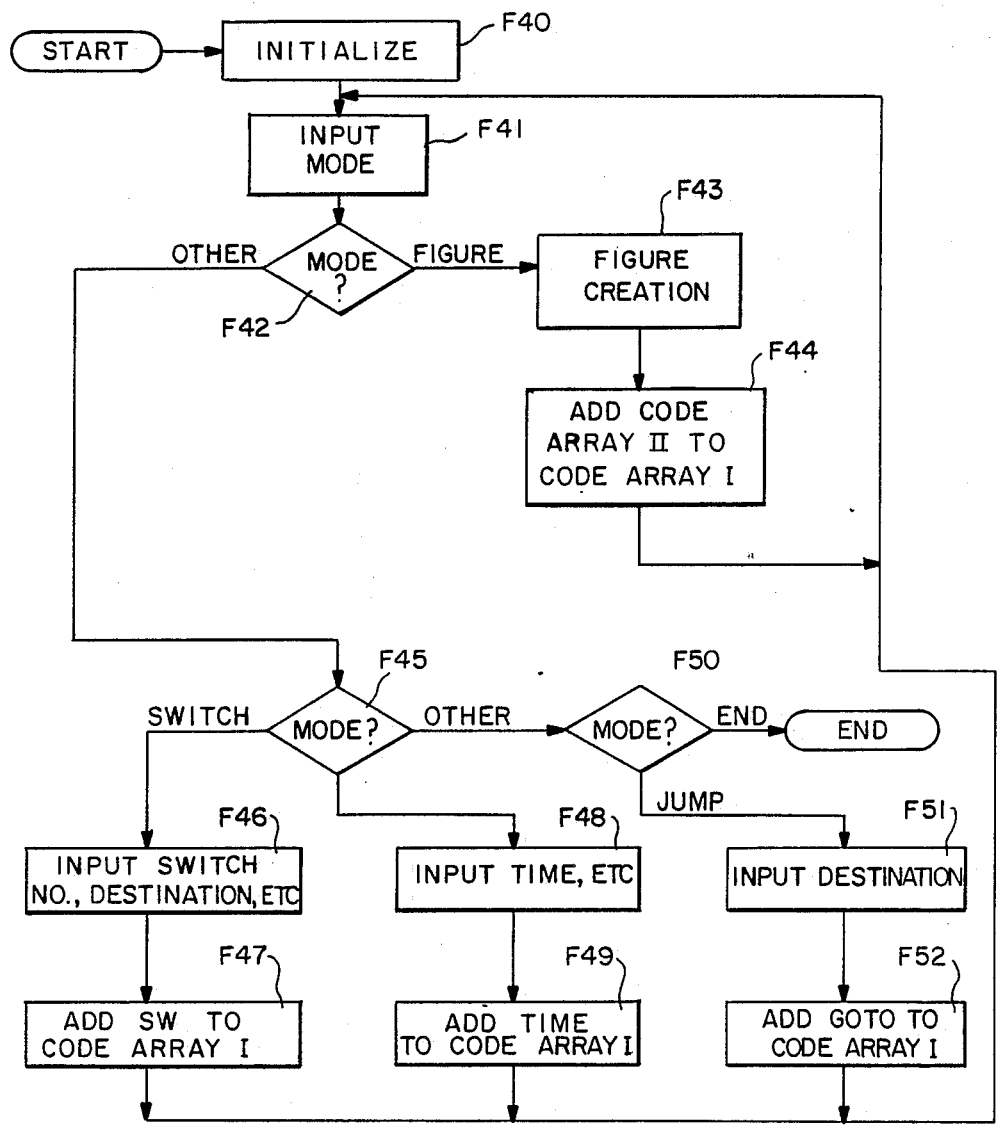
FIG. −9

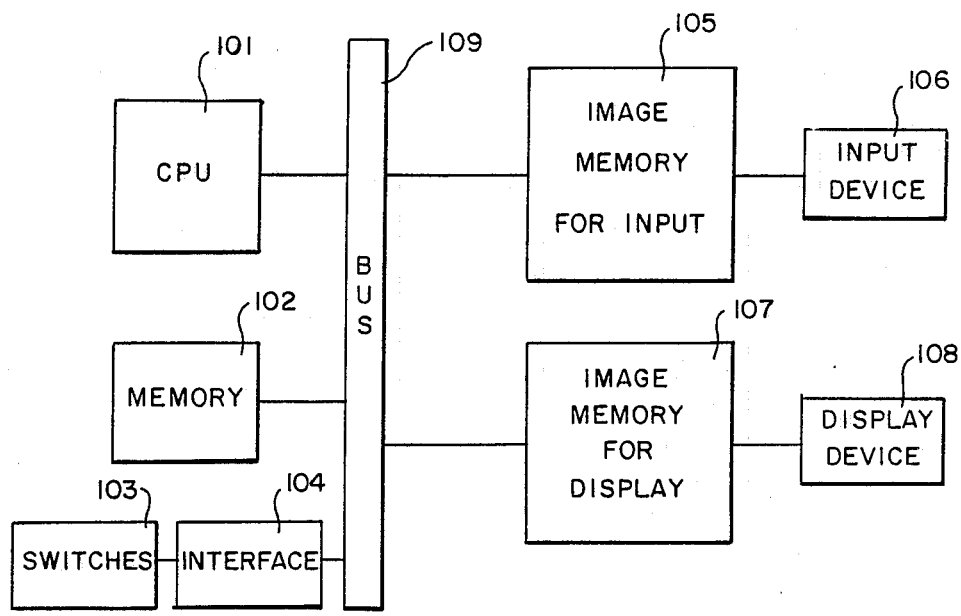
FIG.—11
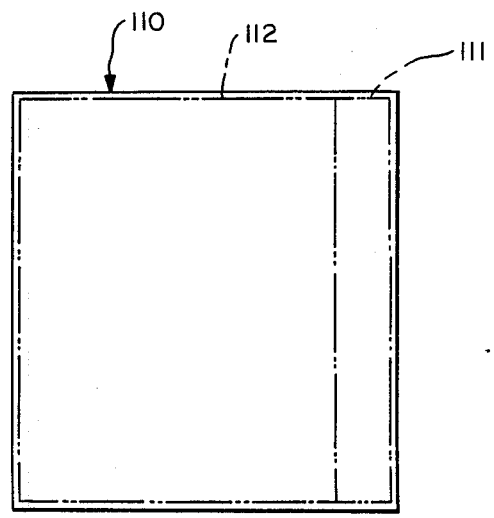
FIG.—12

SYMBOL A:
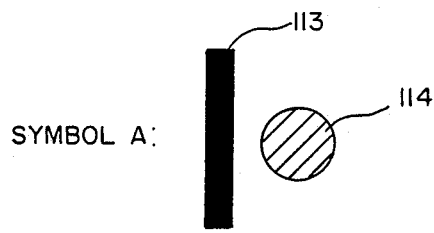
FIG.—13 a
SYMBOL B:
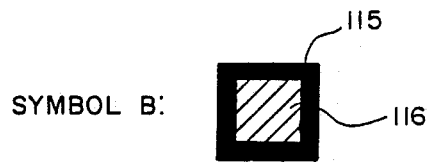
FIG.—13 b
SYMBOL C:
FIG.—13 c
SYMBOL D:
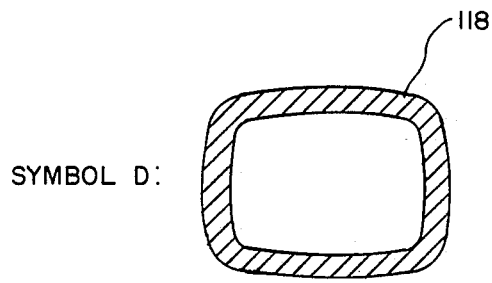
FIG.—13 d

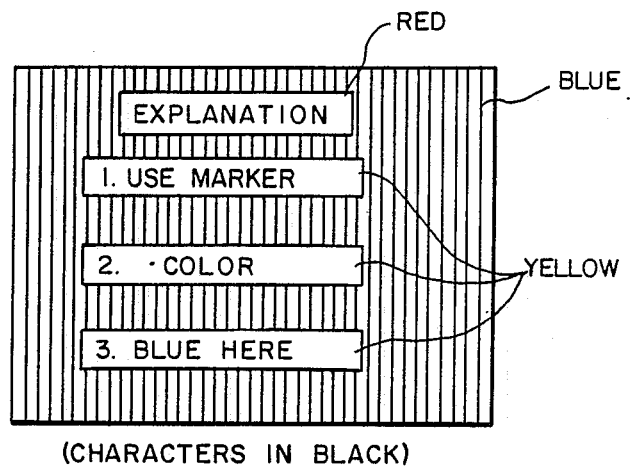
(CHARACTERS IN BLACK)
FIG. — 16
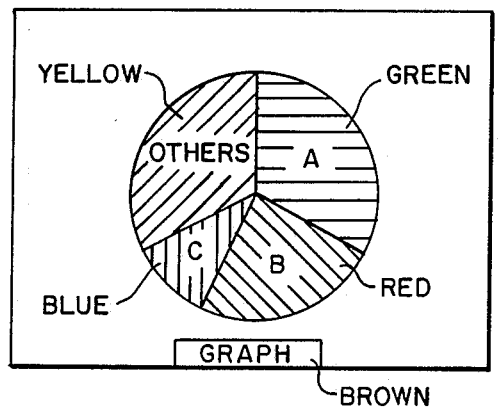
(CHARACTERS AND
BOUNDARIES IN BLACK)
FIG. — 17

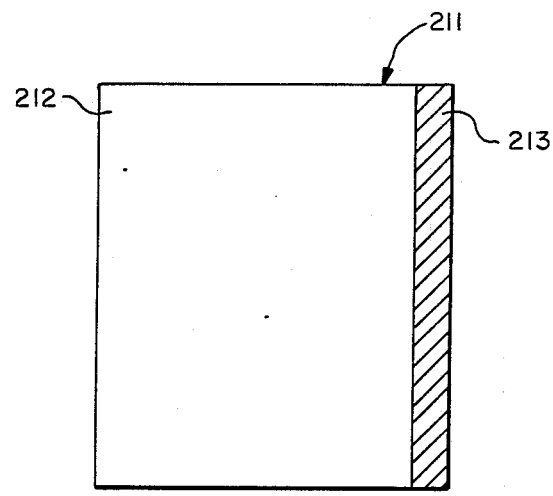
FIG.—22
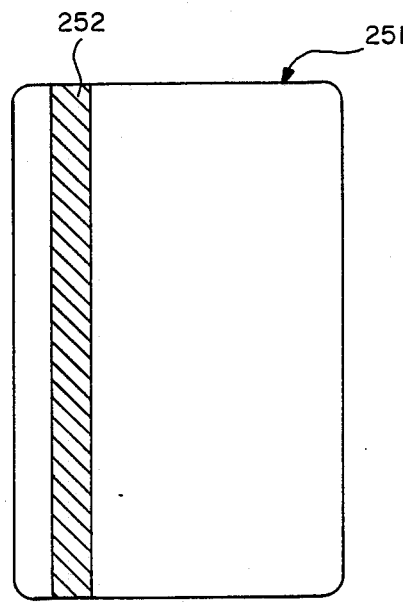
FIG.—23b

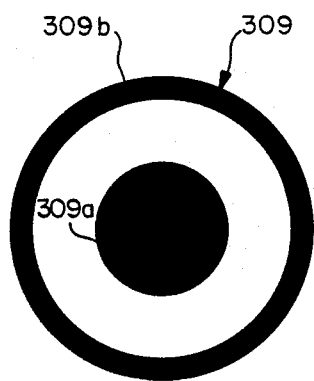
FIG.—29
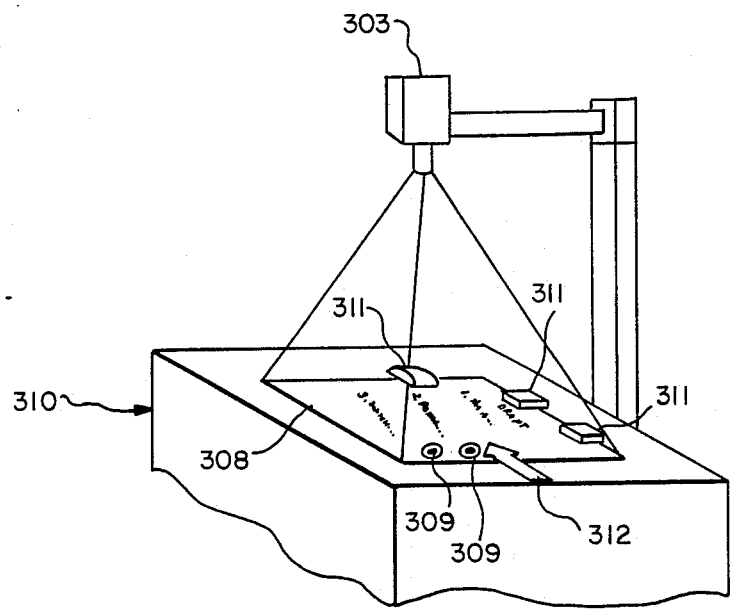
FIG.—30

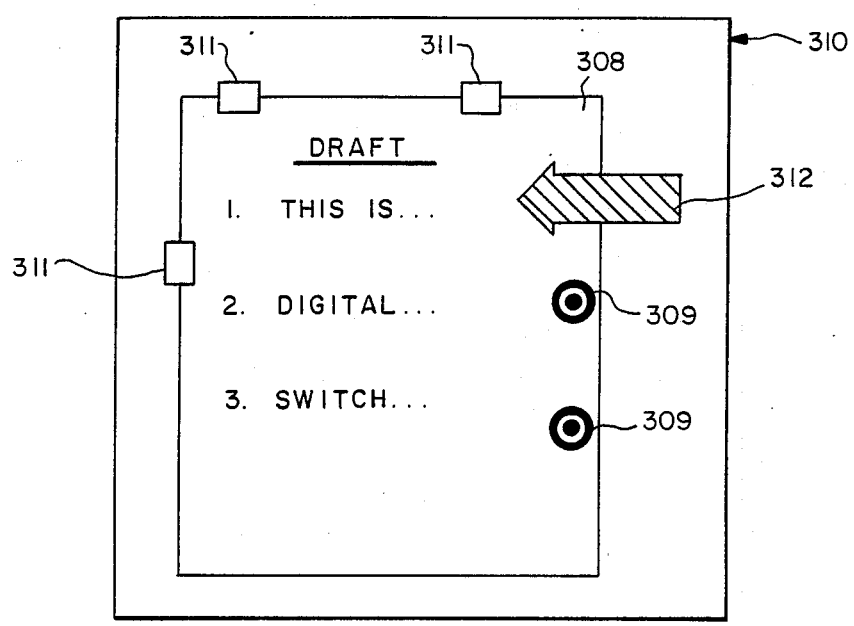
FIG. —31
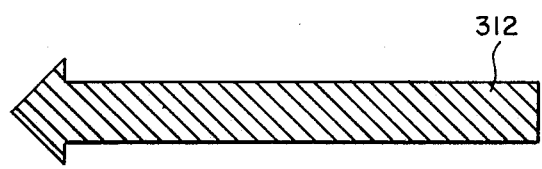
FIG. —32

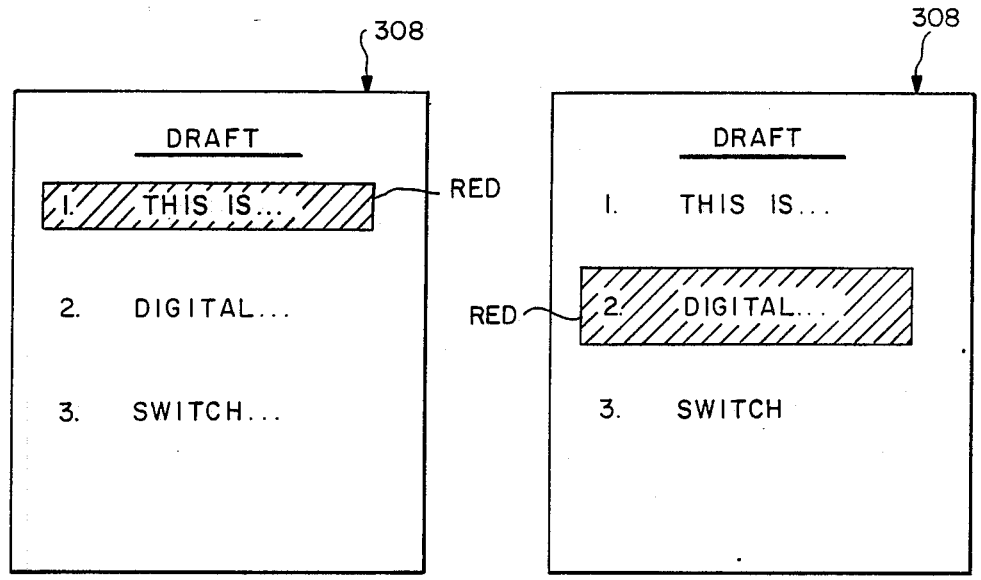
FIG.—34a
FIG.—34b
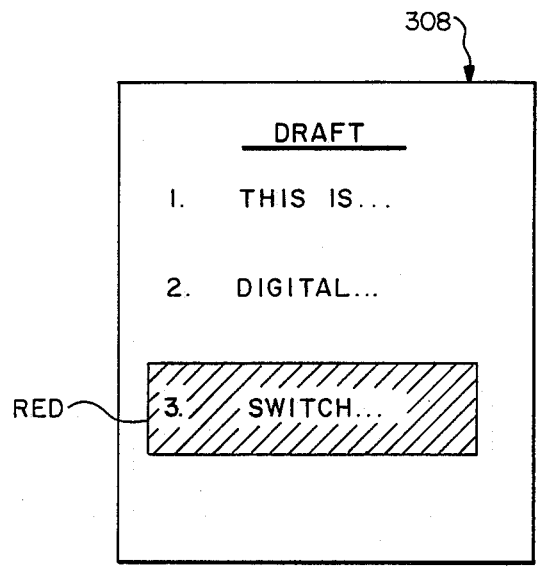
FIG.—34c

DEVICE FOR EDITING AND DISPLAYING DATA RECORDED ON SPECIALIZED SHEETS OR RECORDS

This is a continuation of application Ser. No. 338,553 filed Apr. 13, 1989 now abandoned, which is a continuation of application Ser. No. 092,420 filed Sept. 3, 1987 and now abandoned.

BACKGROUND OF THE INVENTION

This invention relates to a device for editing and displaying an image provided with digital image processing capability and more particularly to such a device adapted to modify and/or edit input image data such as graphs, photographs and sentences and to thereby display an improved image suitable for a presentation.

At a conference or a lecture, it is common to display image data of all kinds such as graphs, photographs and character arrays for a clearer, more effective presentation. Examples of an optical device commonly used for such a purpose include overhead projectors and slide projectors. With an overhead projector, light from a source lamp is passed through a transparency on which diagrams, characters, etc. are recorded and the transmitted light is directed onto a screen by means of an optical system with a lens and a mirror, thereby producing on the screen an enlarged image of the original input image on the transparency. With a slide projector, a slide is used instead of a transparency and light from a source lamp similarly serves to project its enlarged image on a screen. With such conventional display devices, however, it is extremely time-consuming to prepare an original, be it a transparency or a slide, which will provide a visually attractive image because the original image recorded on the transparency or the slide is directly displayed on the screen without first being edited. For the same reason, a so-called dynamic display whereby the image is moved or changed while it is being displayed cannot be effected by such devices. Although a transparency can be moved on the projection table of an overhead projector or superposed on another transparency while it is being shown and although a figure, a character array, etc. can be drawn on a transparency with a source lamp kept on such that the projected image changes in front of the viewer's eyes, these maneuvers are effected manually and on the spot, and hence predictably good results cannot be expected.

A computer may be used to create an original image to be projected by a large-size projector. With an image display device of this type, however, it is generally difficult to create a program and data for an intended display and it is extremely time-consuming to create an original and since the number of picture elements for the display image is usually limited, only a grainy display will result when the original is projected on a large screen. Moreover, computers which are identical or at least similar to each other must be used for the image editing device for creating and editing an image and the image display device for displaying it. This reduces the independence between the image editing and display devices and limits the freedom of choice in system structure.

The inventors herein have previously considered using image data of edited displays or condensing such data by representing them by symbols and to record them in a non-volatile external memory device such that a desired image can be displayed by reading appropriate image data from such a memory device, but the amount of data per image element which must be recorded is already large and data for operating the display device cannot be included.

SUMMARY OF THE INVENTION

It is therefore an object of the present invention to provide an image display device composed of a display device and an editing device which are not heavily dependent on each other such that limitations on structural freedom can be reduced.

It is another object of the present invention to provide such an image display device which edits and creates image data by codifying information on changes and movements of display image and controls the display on the basis of this information, thereby reducing the data size such that a large number of data can be recorded and displayed.

It is still another object of the present invention to provide a device capable of making a visually attractive display from a simple original which can be prepared easily.

It is a further object of the present invention to provide such a device which does not require successive inputs of commands and thus can be operated easily.

The above and other objects can be achieved by devices of the present invention. A device according to one embodiment of the present invention is characterized as using a data recording medium on which are recorded not only display data related to the image to be displayed but also command data which specify how the image should be edited, and comprising means for reading and storing these data, means for carrying out digital image processing on them according to commands which are received and display means such as a projector for displaying an image thus processed. Such command data may be drawn within a specified area on the surface of a sheet serving as the data recording medium such that they can be detected, for example, by the same camera that is used for reading the original display image. Alternatively, a magnetic coating may be provided to such a medium and a magnetic record reader is used to read magnetically recorded commands.

According to another embodiment of the invention, an image editing device and an image display device are independently provided. The image editing device is adapted to create an array of simplified codes specifying not only figure elements to be drawn but also how they are to be processed and arrayed in the order in which they are processed. The code array is recorded in a non-volatile external memory device and retrieved by the image display device which makes a display by interpreting the codes and executing their contents in the given sequence.

Details of these devices embodying the present invention and their advantages are described below.

BRIEF DESCRIPTION OF THE DRAWINGS

The accompanying drawings which are incorporated in and form a part of the specification, illustrate several embodiments of the present invention, and together with the description, serve to explain the principles of the invention. In the drawings:

FIG. 1 is a block diagram of an image editing device which is a part of a device embodying the present invention, FIG. 2 is a block diagram of an image display device which is another part of the device embodying the present invention, FIG. 3 is a drawing for showing the structure of a code, FIG. 4 is a flow chart for the operation of the image display device of FIG. 2, FIGS. 5-8 are drawings of displays on the projector at different stages of data processing, FIG. 9 is a flow chart for the operation of the image editing device of FIG. 1, FIG. 11 is a block diagram of another device embodying the present invention, FIG. 12 is a plan view of a sheet to be used with the device shown in FIG. 11, FIGS. 13(a)-13(d) are examples of symbols to be drawn on the sheet shown in FIG. 12, FIGS. 14 and 15 are examples of input data drawn on the sheet shown in FIG. 12, FIGS. 16 and 17 are displays obtained from the input data of FIGS. 14 and 15, respectively, with the use of the device shown in FIG. 11, FIGS. 18-19 are drawings showing the structure of the sheet shown in FIG. 12, FIG. 22 is a plan view of a sheet to be used with the device shown in FIG. 21, FIGS. 23(a) and 23(b) are the front and back surfaces of a magnetic card, FIG. 29 is an example of command symbol, FIG. 30 is a perspective view of an image display device to be used with the sheet shown in FIG. 28, FIG. 31 is a plan view of a section of the device shown in FIG. 30, FIG. 32 is an enlarged drawing of the plate shown in FIG. 31.

DETAILED DESCRIPTION OF THE INVENTION

Figure 5:
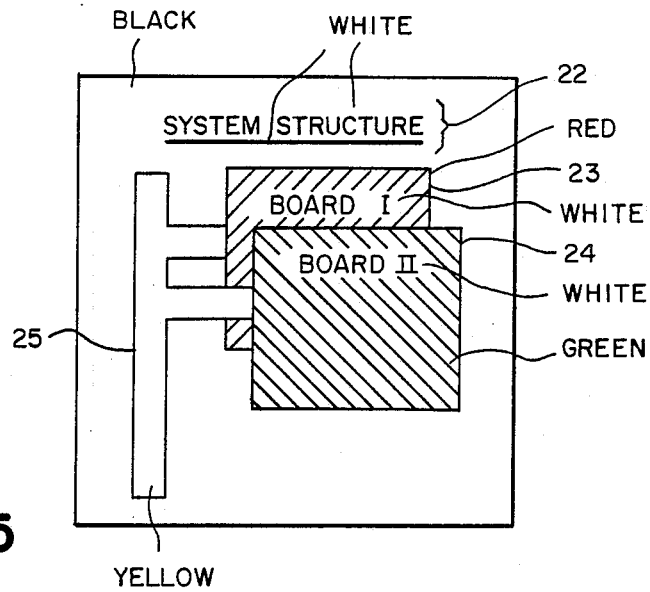

Several devices embodying the present invention will be described below in some detail in order to enable the reader to understand the basic principles of the invention. One of such exemplary devices to be explained below by way of FIGS. 1-10 is comprised of an image editing device and an image display device which are individually shown at 1 and 2 respectively in FIGS. 1 and 2. With reference first to FIG. 1, the image editing device 1 includes a central processing unit CPU 3 which controls the device as a whole and other devices connected to the CPU 3 through a system bus 9 such as a memory device 4 which not only stores programs and data for the CPU 3 but also serves as a working area, an image memory device 5, a mouse 7 as an input means and a floppy disk device 8. The image memory device 5 is also connected to a color CRT monitor 6 as means for displaying an image and is adapted not only to store the values of the individual picture elements of a display image but also to transmit video signals corresponding to these values such that the monitor 6 displays an image according to these video signals. The mouse 7, or an alternative input means such as a tablet or a keyboard, is adapted for the input of simplified codes for specifying the drawing of constituent elements of an image as well as commands and data which constitute simplified codes for specifying the processing of such codes. The codes inputted by the mouse 7 are edited and a code array is created by the CPU 3 which also serves not only to write this code array on a floppy disk in the floppy disk device 8 but also to write an image corresponding to these codes in the image memory device 5. The floppy disk device 8 is a non-volatile external memory device for recording on a floppy disk a code array representing edited image data. The aforementioned CPU 3, memory device 4 and mouse 7 may be together referred to as data creating means.

More in detail, the floppy disk device 8 not only stores data but also serves as means for supplying data to the image display device 2. The image memory device 5 is provided not only with a look-up table but also with two frames such that the individual images on these frames are superposed as one image when displayed on the color CRT monitor 6. Each of these frames of the image memory device 5 contains 640×400 four-bit picture elements and picture element data received from the frames are converted into video signals after they pass through the look-up table to be converted into R (red), G (green) and B (blue) data each of 4 bits. The color CRT monitor 6 serves to display and show to the operator various data such as the image which is being edited or created, a command menu, a mouse cursor and the internal conditions of the image editing device 1.

With reference next to FIG. 2, the image display device 2 includes a floppy disk device 14 which serves as data reading means for reading the data of code array created by the image editing device 1 from the floppy disk device 8 of the image editing device 1, an image memory device 15 for generating video signals of a display image, a central processing unit CPU 10 adapted to write picture element data into the image memory device 15 according to a code array outputted from the floppy disk device 14 and to thereby create in the image memory device 15 a figure corresponding to the code array, a memory device 11 which not only stores programs and data for the CPU 10 but also serves as a working area, a timer 12, operation switches 13, a large-size projector 16 serving as display means for displaying an image according to the video signals from the image memory device 15, a figure-drawing circuit 17 which is controlled by the CPU 10 and draws figures like straight lines, rectangles, circles, ellipses and shades quickly in the image memory device 15 and a character pattern generating circuit 18 which is also controlled by the CPU 10 and writes character patterns quickly with a specified magnification. The aforementioned CPU 10, memory device 11, timer 12, operations switches 13, figure-drawing circuit 17 and character pattern generation circuit 18 may be together referred to as data processing means.

Image display devices of the type described above are well known. An image display device may alternatively include only a CPU instead of many dedicated hardware components as illustrated above. In the example of FIG. 2, the memory device 11, timer 12, operating switches 13, floppy disk device 14, image memory device 15, figure-drawing circuit 17 and character pattern generation circuit 18 are all connected to the CPU 10 through a system bus 19. The figure-drawing circuit 17 and the character pattern generation circuit 18 are connected to the image memory device 15 through an image data bus 20.

The image memory device 15 has the capability of recording an image with 1024×1024 16-bit picture elements and also includes a look-up table by which the image data read from the image memory device 15 for the purpose of display are converted first into red, green and blue brightness data each of 8 bits and then into video signals.

Each of the operation switches 13 is assigned a different number. Whenever any of the operation switches 13 is pressed, a request for an interrupt is communicated to the CPU 10. The timer 12 is set and reset by the CPU 10 and an interrupt is requested to the CPU 10 after a set time interval has elapsed. Both the operating switches 13 and the timer 12 serve to cause a specified event to occur by an external condition and when the CPU 10 accepts their interrupt, it may be interpreted that the CPU 10 has detected the occurrence of the corresponding external condition. The large-size projector 16 is a projection-type image display device with a screen size of 100 inches with 1024 scanning lines. More than one such projector may be utilized together with a video signal distributor. Alternatively, the projector 16 may be substituted by a CRT monitor. The CPU 10 controls the figure-drawing circuit 17 and the character pattern generation circuit 18 according to the code array received from the floppy disk device 14 or creates a figure corresponding to the code array in the image memory device 15 by directly writing image element data in the image memory device 15.

As shown in FIG. 3, the code for causing the image display device 2 to draw figures, to generate a character pattern or to wait is comprised of number, command, data and terminator fields. The codes are generally interpreted and executed in the order of their numbers. Each command shows the type of the code. Table 1 shows examples of commands. Other commands not shown in Table 1 may be additionally included. Data are information belonging to each command. Their number and meanings depend on the type of the command. The terminator is for indicating the end of a code. The number, command and terminator fields are of fixed length but the data fields have variable lengths.

TABLE 1

| Code | Data |
|------|------|
| PSET | X-Y coordinates, color code |
| LINE | Start-end coordinates, color code |
| BOX | Coordinates of opposite corners, color code |
| CIRC | Center coordinates, radius, start angle, end angle, ratio, color code |
| TXTH | Start coordinate of line, character height, character width, character coordinate array, |

TABLE 1-continued

| Code | Data |
|------|------|
|  | character array, color code |
| TXTV | Start coordinate of line, character height, character width, character coordinate array, character array, color code |
| BOXF | Coordinates of opposite corners, color code |
| CROF | Center coordinates, radius, ratio, color code |
| SW | Switch no., destination |
| TIME | Timer no., time |
| GOTO | Destination |
| HALT |  |
| WRLD | X-Y coordinates |
| CLOR | Color code, brightness (R, G and B) |

Next, the types of codes shown in Table 1 are explained together with the meanings of data associated with each code. PSET, LINE, BOX and CIRC are respectively a command to change the point at the specified coordinates into the color shown by the color code, to draw a straight line in the specified color, to draw a rectangular and to draw an ellipse (or a circle). TXTH and TXTV are respectively a command to write a horizontal and vertical character array. BOXF and CRCF are respectively a command to draw a rectangle and an ellipse (or a circle) with the interior shaded (filled) inside. A code array which is created by arranging these codes in an appropriate sequence shows not only the types of figure elements to be drawn such as points, lines, rectangles and ellipses but also the sequence in which they are drawn. Such a code array also represents data of a unique image obtainable by drawing figure elements sequentially according to the codes.

SW, TIME, GOTO and HALT are examples of codes for controlling the interpretation and execution of a code array of the image display device 2. SW is a code for setting the address of the code to be executed next when the operating switch 13 was pressed. When the operating switch 13 is pressed, the code at the address set by SW is interpreted and executed, and interpretation and execution are continued from this address. TIME is a command to wait for a fixed period of time determined by the data entry of TIME. When the set period of time has elapsed, the system comes out of the wait condition and the code at the next address is interpreted and executed. GOTO is a code for changing the address where interpretation and execution should take place. When this code is executed, the code to be translated and executed next becomes the one with the address shown in the data field of this code. HALT is a code for indicating the end of interpretation and execution. With this code, code interpretation and execution are completed and the system continues to wait until a new code array is inputted or a command is received for its interpretation and execution while the image formed in the image memory device 15 is displayed on the large-size projector 16. WRLD and CLOR are codes for specifying a coordinate system and a display color, respectively. On the screen of the large-size projector, (0,0) represents the coordinates of the top left-hand corner and the coordinates shown in the data field of WRLD represent those of the bottom right-hand corner. The coordinates shown in the data fields of codes for drawing figures and generating character patterns always refer to this coordinate system. When a code array is edited or created, therefore, a code can be created independently of the number of picture elements of the large-size projector 16. Projectors with different numbers of picture elements can be used, depending on the purpose for which they are used. CLOR is a code for establishing a relationship between a color code and the actually displayed color. In other words, this code serves to define what should be the actual colors corresponding to the color codes shown in the data fields of codes for drawing figures and generating character patterns. This code defines a display color by a set of three values for red, green and blue, each in 256 steps.

Tables 2 and 3 are examples of code arrays created by the image editing device 1 except the codes at addresses 2-14 of Table 3 are identical to those in Table 2 and hence are omitted. In Tables 2 and 3, the numbers on the left-hand ends are addresses which indicate the code sequence. Commands are shown next to the addresses and data are further on the right-hand sides of the commands. Symbol "/" indicates a terminator and "," indicates a separator for separating items. For example, the code at Address 1 in Table 2 is for establishing a coordinate system on the display screen with coordinates 0-512 both in the horizontal and vertical directions. The code at Address 2 is for specifying that the display indicated by the color code 1 should be displayed with brightness of (R,G,B)=(200, 200, 200). The codes at Addresses 2-5 similarly define other color codes 2-5. The code at Address 16 is a command to keep displaying the created image on the large-size projector 16 and wait until another code array is interpreted and executed and a command to display the image thus formed is received.

TABLE 2

| 1 | WRLD 512, 512, / |
|---|---|
| 2 | CLOR 1, 200, 200, 200, / |
| 3 | CLOR 2, 200, 0, 0, / |
| 4 | CLOR 3, 0, 200, 0, / |
| 5 | CLOR 4, 0, 0, 200, / |
| 6 | CLOR 5, 100, 100, 0, / |
| 7 | LINE 100, 70, 400, 70, 1, / |
| 8 | TXTH 105, 65, 32, 32, (110, 160, 210, 260, 310, 360), "SYSTEM STRUCTURE", 1, / |
| 9 | BOXF 160, 100, 400, 340, 2, / |
| 10 | BOXF 190, 160, 430, 400, 3, / |
| 11 | BOXF 60, 100, 90, 480, 5, / |
| 12 | BOXF 90, 160, 160, 190, 5, / |
| 13 | BOXF 90, 220, 190, 250, 5, / |
| 14 | TXTH 220, 140, 24, 24, (220, 250, 280, 310,), "BOARD", 1, / |
| 15 | TXTH 250, 200, 24, 24, (250, 280, 310, 340,) "BOARD II", 1, / |
| 16 | HALT / |

TABLE 3

| 1 | WRLD 512, 512, / |
|---|---|
| : | : |
| 15 | TXTH 250, 200, 24, 24, (250, 280, 310, 340,) "BOARD II", 1, / |
| 16 | SW 1, 18, / |
| 17 | GOTO 17, / |
| 18 | BOXF 190, 450, 430, 500, 4, / |
| 19 | BOXF 90, 465, 190, 485, 5, / |
| 20 | TXTH 238, 487, 24, 24, (238, 298, 358), "CPU",D 1, / |
| 21 | SW 1, 23, / |
| 22 | GOTO 22, / |
| 23 | SW 1, 29, / |
| 24 | BOXF 190, 450, 430, 500, 4, / |
| 25 | TIME 10, / |
| 26 | TXTH 298, 487, 24, 24, (298), "?", 2, / |
| 27 | TIME 10, / |
| 28 | GOTO 24, / |
| 29 | HALT |

In summary, a code array corresponding to a desired image is created by the image editing device 1 and is record on a floppy disk by the floppy disk device 8. The code array thus recorded is read by the floppy disk device 14 of the image display device 2 under the control of the CPU 10 and an image corresponding to the retrieved code array is created in the image memory device 15 by the figure-drawing circuit 17 and/or character pattern generation circuit 18 or directly by the CPU 10. With reference to the flowchart of FIG. 4, floppy disk device 14 reads the code array corresponding to a desired image (Fa), the commands of the individual codes in the retrieved code array are interpreted by the image display device 2 (F2-F15). In Step F2, for example, it is determined whether the ith command is PSET or not and, if it is, the corresponding processing is carried out, that is, a point is drawn (F16). If the ith command is not PSET on the other hand, it is checked whether it is LINE or not (F3), and so forth. The broken lines 21 in the flow chart of FIG. 4 indicate the omission of Steps F4-F13 for checking whether or not the ith command is BOX, CIRC, TXTH, TXTV, BOXF, CRCF, SW, TIME, GOTO, WRLD and CLOR and Steps F18-F27 wherein processing of these commands are correspondingly carried out. The processing in Steps F16-F28 corresponding to various commands comprises drawing figure elements in the image memory device 15 according to the conditions such as coordinates and color specified in the data fields of the commands. The actual processing may be performed, as explained above, either directly by the CPU 10 or by the figure-drawing circuit 17 and/or the character pattern generation circuit 18 under the control thereof. By either method, the processing can be carried out extremely fast. Typically, it takes only 1-2 seconds to individually interpret the figure-drawing and character pattern generating codes within a code array and to create figures in the image memory device 15. Alternatively, the program may be so structured that no display is made on the large-size projector 16 while figures are created. In such a case, the projector 16 displays only the final image which is created after a series of processing is performed according to the sequence shown by the code array. Processing of codes at Addresses 1-15 of Table 2, for example, is performed at a high speed in Steps F16-F20, and the program comes to wait (F15) by the HALT at Address 16. FIG. 5 shows the image created by processing the aforementioned codes at Addresses 1-15 and displayed on the large-size projector 16. With reference to FIG. 5, the figure at 22 is created by the codes at Addresses 7 and 8, the figure at 23 is created by the codes at Addresses 9 and 14, the figure at 24 is created by the codes at Addresses 10 and 15 and the figure at 25 is created by the codes at Addresses 11, 12 and 13.

If the response in Step F15 with reference to the flowchart of FIG. 4 is NO, it is interpreted as an error and a special process prepared for such a situation is carried out (F31). If the response is YES, the system waits for the input of another command to display an image (F29). If there is such an input, the program returns to Step F2 but the program comes to an end if a command to end is received (F30).

Figure 6:
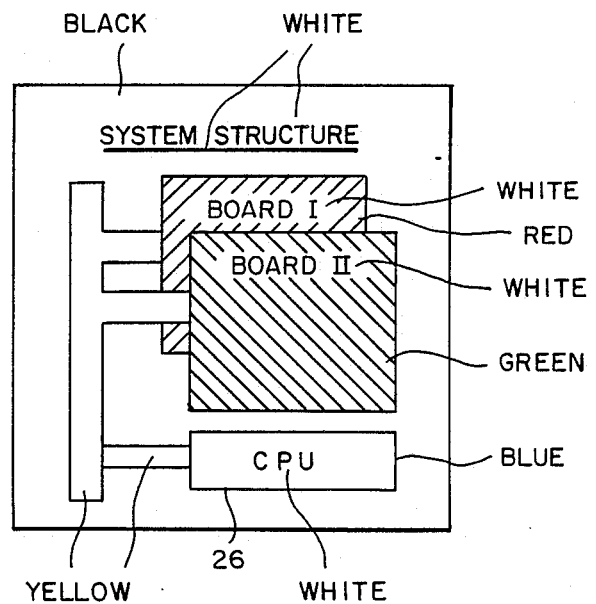

Next, let us assume that the code array shown in Table 3 has been received at Step F29 of the flow chart of FIG. 4 and the operation of the image display device 2 for such a situation will be described. To start, the image display device 2 quickly interprets and executes the codes at Addresses 1-15 and creates a display image as shown in FIG. 5. The next code at Address 16 indicates that interpretation and execution of codes should be started from the one at Address 18 if the operating switch 13 on the image display device 2 is pressed. The code at Address 17 serves to change the number of the code to be interpreted and executed next, thereby altering the course of the program flow. Since the code at Address 17 is for making a jump to its own address, there results an infinite loop and the image shown in FIG. 5 continues to be displayed on the display screen of the large-size projector 16. When this display becomes unnecessary, the user presses the operating switch 13, thereby leaving the loop according to the command at Address 16 and resuming the interpretation and execution of codes from Address 18. Additional figures and characters are drawn as shown in FIG. 6 by the codes at Addresses 18-20. Thereafter, the program enters another infinite loop by the code at Address 22 and the projector 16 continues to display the image of FIG. 6. When this display becomes unnecessary and the operating switch 13 is pressed again, processing is resumed from the code at Address 23 according to the command in the code at Address 21. The code at Address 24 serves to erase the character pattern "CPU" from the displayed figure at 26. The display after this step, therefore, is as shown in FIG. 7. This is followed by a wait period of one second according to the command at Address 25 and the processing is resumed thereafter from the code at Address 26. During this wait period of one second, the same image shown in FIG. 7 remains displayed. The code at Address 26 causes character pattern "?" to appear in the figure at 26, thereby displaying the image shown in FIG. 8 which remains displayed during the following wait period of one second according to the code at Address 27. The code at Address 28 causes the processing to jump to Address 24 and the series of processes according to codes at Addresses 24-28 is repeated. During this repetition period, the large-size projector 16 will be alternately displaying the images of FIGS. 7 and 8 for one second each time. In order to leave this infinite loop, one needs only to press the operating switch 13 again, thereby proceeding to Address 29 and ending the entire process.

Next, let us review the flow of processes described above from the point of view of images displayed on the large-size projector 16. Initially, the image of FIG. 5 is displayed and this image remains displayed until the operating switch 13 is pressed and the image of FIG. 6 appears instead. When the operating switch 13 is pressed again, there follows a period during which the images of FIGS. 7 and 8 are repeatably and alternately displayed for one second each. In other words, the character pattern "?" of FIG. 8 appears and disappears every second. This blinking of the character pattern continues until the operating switch 13 is pressed subsequently and when it is done, the display by this code array comes to an end. In summary, the display of images by the image display device 2 follows a code array preliminarily created by the image editing device 1 and the images changed by the operation of the operating switch 13 and/or by a predetermined timing sequence.

The image editing device 1, on the other hand, creates a code array as shown by the flow chart of FIG. 9. After an initialization process (F40), a mode is selected and inputted (F41), for example, for creating a figure, setting the operating switch 13, the timer 12 or a jump, or terminating. If a mode for creating a figure is selected, the process goes from Step F42 to Step F43 and a code array for an element of a desired figure is created by a figure-creation routine. The code array thus created is identified as "Code Array II" in the flow chart of FIG. 9 and, after the process of the figure-creation routine is completed, Code Array II is added to Code Array I which indicates the code array which has been stored and will be recorded on the floppy disk in the floppy disk device 8 at the end of the editing and/or creation process to be interpreted and executed by the image display device 2. After Step F44, the process returns to Step F41.

In the mode for setting the operating switch 13, the timer 12 or a jump, data such as switch no., destination of a jump, wait period of the timer, etc. are entered (F46, F48 or F49 from F42 and F45 or F50) and code is created on the basis of such input data and added to Code Array I (F47, F49 or F52). Besides the above, there are provided such additional functions as the dump function whereby the contents of a code array are directly outputted by characters and the step simulate function whereby codes are interpreted and executed sequentially one code at a time. These additional functions are not included in FIG. 9 (or FIG. 10 below) but they may be used to find the destination (address) to which a jump may be effected.

Figure 10:
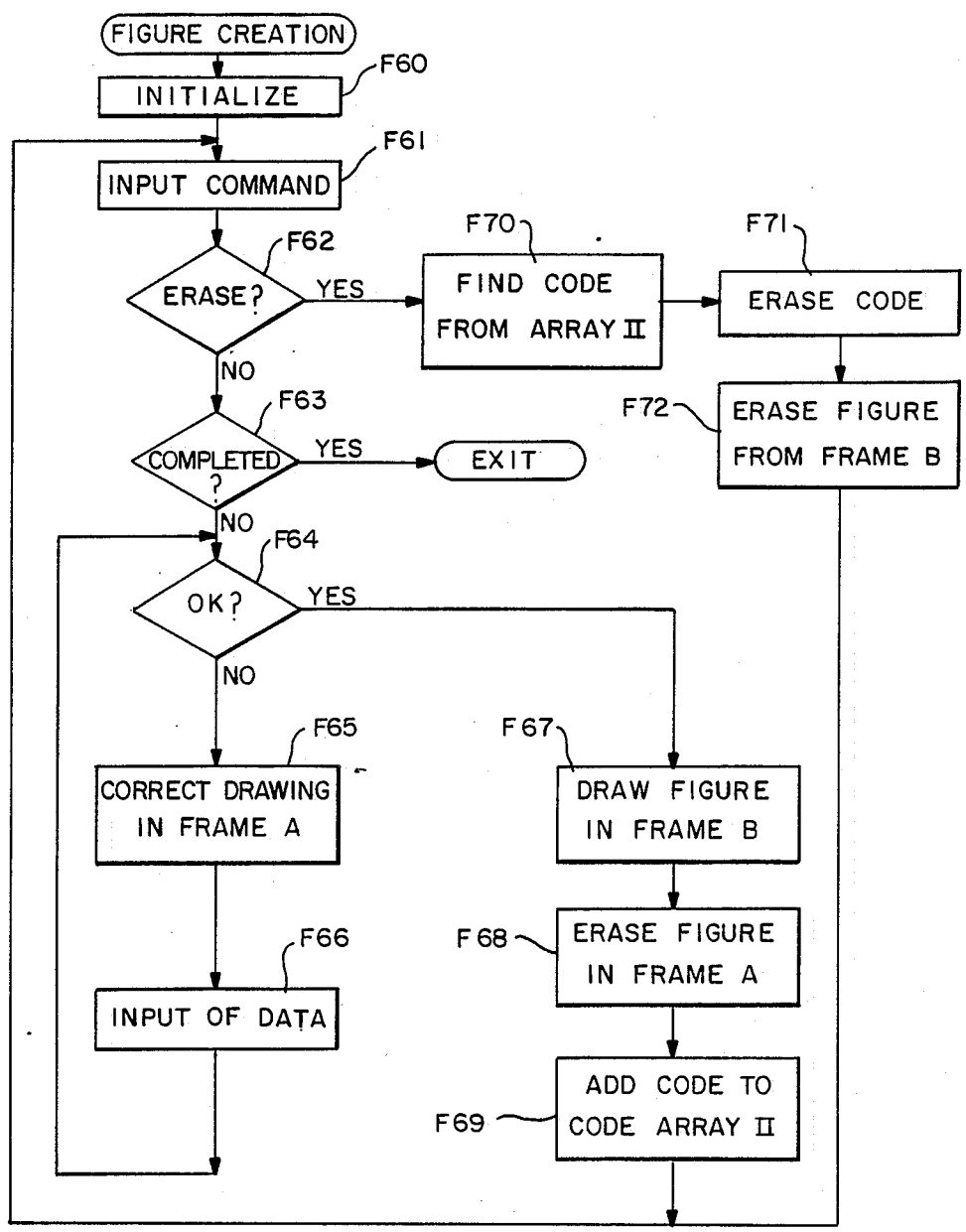
FIG. 10 is a flow chart for the operation of a figure-creating routine.

The figure-creation routine referred to above in connection with Step F43 of FIG. 9 may be performed as shown by the flow chart of FIG. 10. After an initialization step (F60), a command is entered (F61). The commands which are of interest to this routine are either of the figure-erasing type or of the figure-drawing type, "figure" including character patterns. A figure-erasing command is for erasing a code within Code Array II when it later becomes unnecessary, that is, for the purpose of deleting a code entered earlier for drawing a figure element. Figure-drawing commands include those corresponding to codes for drawing figures, that is, commands for drawing a point, a straight line, a rectangle and an ellipse, for shading (filling) the interior of a rectangle or an ellipse, and for generating a character pattern, etc. If the inputted command is one of the figure-drawing type (NO in F62), the corresponding figure element is added. Unless the desired figure has been completed (NO in F63), the operator watches the figure displayed on the color CRT monitor 6 and if corrections are necessary, a figure element specified by way of a command is written in Frame A of the image memory device 5 (F65) provided for the purpose of temporarily storing a figure element while its data are amended. If the figure displayed on the color CRT monitor 6 is not satisfactory and corrections are needed, the operator enters the data for the correction (F66) such as coordinates, color code and/or character pattern. After a change is effected on data, the figure element drawn on the basis of earlier data is erased and another figure element is redrawn by the new data. After this sequence is repeated until the operator obtains the desired figure element (YES in F64), the figure on Frame A is copied onto Frame B (F67) and the figure is thereafter erased from Frame A (F68). Frame B is provided for the purpose of storing a figure element which has been completed and corresponds to the code inputted to aforementioned Code Array II. After Step F68, the code created from the command inputted in Step F61 and the data inputted in Step F66 are added to Code Array II. Code Array II is emptied by the initialization step (F60) and, as explained above by way of FIG. 9, its contents are transferred into Code Array I (F44) at the end of a figure-creation routine (F43).

If the command which was inputted in Step F61 is of figure-erasing type (YES in F62), the code corresponding to the figure to be erased is retrieved from Code Array II (F70) and the retrieved code is erased (F71). As a result, the figure corresponding to the erased code is erased from aforementioned Frame B of the image memory device 5 (F72). In summary, Code Array II is a code array which is temporarily created in the figure-creation routine (F43) and serves to make the retrieval of code easier in the case of a figure-erasing command.

If the image display device 2 is provided with a plurality of operating switches 13, different processes to be carried out by pressing different ones of these switches 13 may be set by code arrays in Step F47. For example, the program may be so designed that codes from Address 10 are executed if a certain one of the switches 13 is pressed and codes from Address 20 are executed if another switch is pressed. In this manner, the flow of code arrays interpreted and executed by the image display device 2 can be changed by pressing different ones of the operating switches 13. Since the operating switches 13 may each be considered as a means for detecting the occurrence of a certain event by an external cause, they can be used in different useful ways. For example, remote control switches by infrared radiation or radio waves, a switching means provided on the screen of a display device such as a CRT, a switch for detecting the interruption of an infrared beam, a switch adapted to detect sound volume (for example, of applause by the audience) and activated only when the detected sound level has reached a certain predetermined level, a switch based on voice recognition, a timer switch activated according to a set timing, a switch activated only by a sound wave of a certain frequency or by a particular intermittent way in which it is received, etc. may be utilized with the present invention.

What has been described above is only one example of devices according to the present invention. It goes without saying that many modifications and variations are possible within the scope of the present invention. For example, the image display device 2 described above was in part characterized by its ability to draw various figure elements at high speeds and to execute individual figure-drawing codes nearly instantly, but this characteristic should be interpreted merely as illustrative and not as limitative. According to another embodiment of the present invention, the speed of drawing figures intentionally made slow such that the process of figure elements being drawn on the color CRT monitor 6 of the image editing device 1 or appearing on the large-size projector 16 of the image display device 2 itself can be displayed. For such a purpose, a code for creating figure elements slowly is additionally provided to the system described above. Such a code may include as one of its data items a parameter by which the speed of drawing figures or the total time required to draw a figure element can be controlled. Following are new codes of this type which may be considered desirable in some situations:

(1) for drawing a straight line at a specified speed;
(2) for drawing a rectangle at a specified speed;
(3) for drawing a circle at a specified speed;
(4) for drawing a filled rectangle (with shaded interior) or filling the interior of a rectangle sequentially from the left-hand side to the right-hand side at a specified speed;
(5) for drawing a filled rectangle (with shaded interior) or filling the interior of a rectangle sequentially from the bottom side to the top side at a specified speed;
(6) for making a rectangle with shaded interior gradually appear clearer;
(7) for making a rectangle with shaded interior gradually grow larger or shading the interior of a rectangle from the center towards its peripheries at a specified speed; etc.

The rectangles in the above may also be replaced by circles, ellipses or triangles. In addition, a code for simultaneously drawing a plurality of figures like rectangles and circles may be considered. Such a code may have as its data items the types of figures to be drawn simultaneously, their coordinates and pointers to the items where they are drawn.

The image display device 2 can be made to draw figure elements slowly according to these new codes by inserting execution of a wasteful command, by using the timer 12 to provide a wait period or by any method of reducing the drawing speed. The drawing speed can be controlled by the number of wasteful commands to be executed, by changing the timer setting, etc.

New codes of the types (4), (5) and (7) described above can be executed by altering the sequence of the addresses of the figure elements created for drawing a figure. A code of the type (6) described above can be executed by dividing the desired rectangle into areas of 5×5 picture elements, drawing only one of the 5×5 elements of each area per scan and repeating such a scan 25 times. Since the picture elements which are scattered all over the rectangle are gradually redrawn by this method, the rectangle will seem to emerge gradually. Such new codes can be easily created by the image editing device by adding a parameter of drawing speed during the process of creating figures.

Among the many advantages which can be enjoyed with the devices embodying the present invention, it may be particularly mentioned that the number of data which must be exchanged is reduced and data of many images can be recorded in a recording medium because data, according to the present invention, are transferred between an image editing device and an image display device through simplified codes for specifying drawing of constituent elements of an image such as figures and character patterns, and this has the effect of significantly improving data processing capability. Another advantage attainable by the present invention relates to the independence between the image editing device and the image display device regarding their specifications. For example, the image editing device may have a screen with a small number of picture elements such as 400×600, using simple figure-drawing algorithms and character font of 24×24 dots while the image display device has the capability of making a showy display on a screen with 1024×1024 picture elements, adopting a high-quality figure-drawing technology and a method of generating character patterns by vector data. Since the image display device has only to be able to interpret and execute codes, there are no limitations regarding the display screen or the method of drawing.

Next, FIGS. 11-19 are referenced to describe another device embodying the present invention, characterized as comprising a sheet (hereinafter descriptively referred to as an original sheet) on which are recorded symbols for determining data on display such as shape, color and position of display. With reference first to FIGS. 11 and 12, this device comprises a CPU 101 serving as image processing means, a memory device 102 for storing programs and data for the processing by the CPU 101 and also serving as a data area, switches 103 for starting and ending the reading of an image, etc., an interface 104 connected to these switches 103, an original sheet 110 with display data and symbols (to be explained below), an input device 106 serving as image input means for taking in display data and symbols as input image from the original sheet 110, an image memory device for input 105 adapted to store the input image received from the input device 106, an image memory device for display 107 which stores display image data created by the CPU 101 from the input image data stored in the image memory device for input 105, and an image display device 108 serving as means for displaying the display image data stored in the image memory device for display 107. Of the above, the memory device 102, the interface 104 and the image memory devices for input and display 105 and 107 are connected to the CPU 101 through a bus 109. The device is also provided with a table (not shown) for placing the sheet 110 thereon. If an overhead projector is used as the image display device 108, this table may be its projection table. In order to be less narrowly descriptive, this table may be referred to generally as image input table.

The CPU 101 is adapted to receive input data from the switches 103 through the interface 104, to control the input and display of images, to extract and identify symbols corresponding to input image data which are received, to create display image data by executing image processing such as coloring according to commands given through the symbols drawn on the sheet 110, etc. The image memory device for input 105 is adapted to accept a color image by standardization and quantification processes to be explained below. The input image is received by about 512×512 picture elements of 8 bits each for red, green and blue. It takes about 1/30 second to process one sheet of image. The CPU 101 can read the contents of the memory device 105 and write thereinto. The image input device 106 may comprise a color video camera. The image display device 108 may comprise a color CRT monitor. If a display to many persons is desired, several color CRT monitors may be provided. Alternatively, a projector with screen size of 100 inches may be used. The image memory device for display 107 is provided with the capabilities of a look-up table for image display and of creating a video signal, and includes three frames of 640×400 8-bit picture elements. Picture element data which are read from each frame for the display of an image are converted by look-up tables and thereafter become a video signal by passing through a digital-to-analog converter and a low-pass filter. The three frames are individually provided with a look-up table, serving as three monochromatic red, green and blue image memory devices, and a color image is displayed by these three frames. The CPU 101 can read from and write into these frames and the three look-up tables.

To be drawn and recorded on the original sheet 110 are not only data to be displayed but also symbols for determining the display conditions of these display data on the image display device 108 such as shape, color and position and for specifying image processing that will achieve such a display. On the original sheet 110, a symbol area 111 of a belt-like shape is reserved along the right-hand side, as shown in FIG. 12, exclusively for recording such symbols. The remaining area (referred to as the display image area) 112 on the left-hand side of the original sheet 110 is used for drawing an image to be displayed. A straight line is drawn on the aforementioned image input table and a camera is so positioned with respect to the table that if the sheet 110 is placed on the image input table with the boundary between its symbol area 111 and display image area 112 roughly coinciding with this line drawn on the table, the symbol area 111 and the display image area 112 can be made to correspond to separate specified regions in the image memory device for input 105.

FIGS. 13(a)–13(d) show examples of symbols which may be drawn in the symbol area 111 of the original sheet 110 according to one embodiment of the present invention to be described below. In these figures, thick lines are to be drawn in black and the shaded areas are to be filled in a desired color. Symbol A shown in FIG. 13(a) indicates that the image processing is to be performed such that the character pattern, etc. written in the display image area 112 on the left-hand side of the symbol will be surrounded in the display by a rectangle with its interior shaded in a selected color. The vertical bar which is drawn as a part of Symbol A indicates the vertical position of this rectangle, the upper and lower ends of this vertical bar 113 indicating the upper and lower sides of the rectangle. The circle 114 to be drawn as another part of Symbol A is for the purpose of specifying the color inside the rectangle. In other words, the background area inside the rectangle excluding characters, etc. will be filled in the display in the same color indicated by the circle 114, or a color similar thereto. The circle 114 is positioned on the right-hand side of and at the same height as the vertical bar 113. The coordinates of the left-hand and right-hand sides of the rectangle are automatically determined with respect to the character array or the like drawn in the display image area 112 on the left-hand side of the symbol.

Symbol B shown in FIG. 13(b) is composed of a black rectangular frame 115 and its colored interior 116 and specifies that the background inside the region of the display image area 112 defined by Symbol D shown in FIG. 13(d) is to be filled in the color of the rectangle's interior 116. Symbol D is provided for defining a closed region in the display image area 112. The shape of the enclosed region to be defined is not limited to the shape shown in FIG. 13(d). Regions with more complicated shapes may be defined. Symbol D is intended to be used in combination with Symbol B, that is, Symbol D alone has no meaning. In other words, only when Symbol B is in the symbol area 111, the process of searching for Symbol D having the same color as Symbol B can be executed. Thus, the color of the frame of Symbol D must be the same as that of the rectangular interior 116 of Symbol B. Symbol D may be present at more than one place corresponding to single Symbol B.

Figure 14:
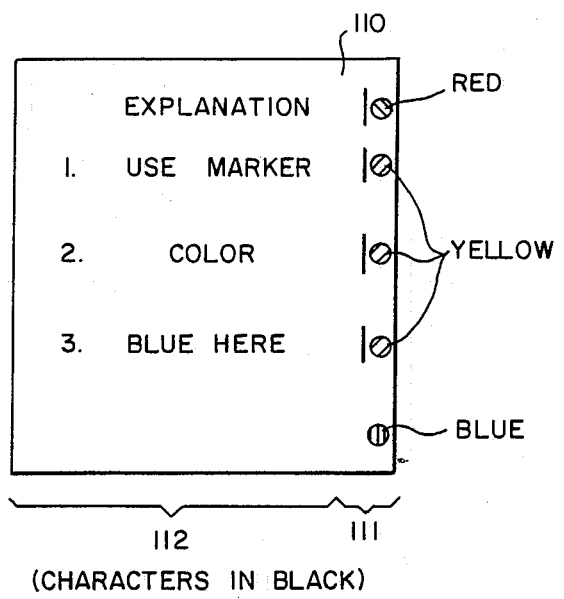
Figure 15:
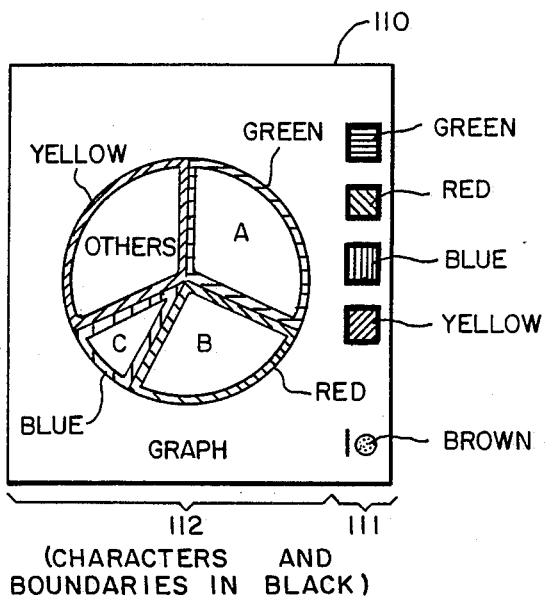

Symbol C shown in FIG. 13(c) is a single colored circle 17 and serves to specify the background color of the remaining region the color of which has not been specified by Symbols A, B and D. FIGS. 14 and 15 are examples of image input, that is, what may be drawn in the symbol area 111 and the display image area 112 of the sheet 110 when displays shown in FIGS. 16 and 17, respectively, are desired.

Figure 18:
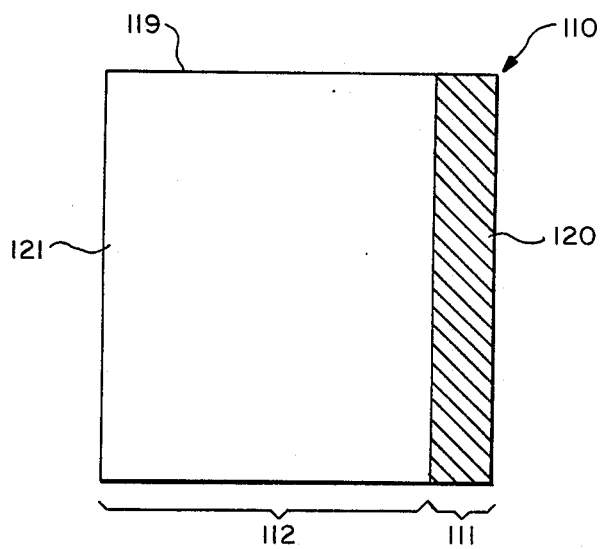

As shown in FIG. 18, the sheet 110 according to one embodiment of the present invention is made of a transparent film 119 which allows figures and characters to be drawn thereon, for example, by a felt-tip pen. A belt-like non-transparent area 120 is formed by coating the back surface of the portion corresponding to the symbol area 111 with a white, adhesive, opaque coating material, leaving a transparent part 121 corresponding to the display image area 112. The sheet 110 thus formed can be used not only with the device of the present invention described above but also with an ordinary overhead projector. When it is used with the device described above, a white sheet of paper or the like is placed on the back side of the transparent part 121 to create a white background such that data marked in the display image area 112 can be inputted. When it is used with an overhead projector, the display image area 112 is left in its transparent condition such that only the data marked thereon are projected on a screen because images on the symbol area 111 are in the nontransparent area 120. Alternatively, the operator may move the entire sheet 110 on the projection table (data input table) by the widths of the nontransparent area 120 such that not even its shadow will appear on the screen.

Figure 19:
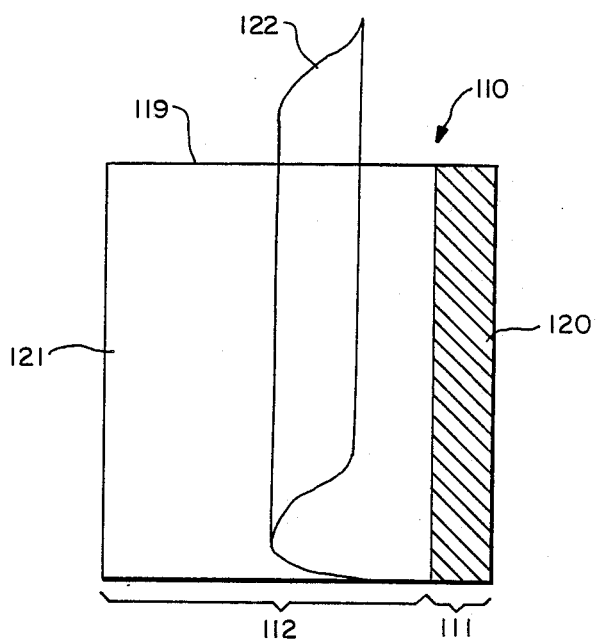

FIG. 19 shows another type of original sheet 110 comprised of a sheet as shown in FIG. 18 and a second transparent sheet 122 of the same size superposed thereon. The two transparent sheets 119 and 122 are joined together on the right-hand sides such that they will not slide with respect to each other. The second transparent sheet 122 is primarily for drawing Symbol D thereon. The original sheet 110 of FIG. 19 is also usable both with the device of the present invention described above and with an ordinary overhead projector. When it is used with an overhead projector, the second transparent sheet 122 is turned as shown such that only the input image in the display image area 112 of the first transparent sheet 119 will be projected on the screen. As explained above in connection with FIG. 18, the symbols in the symbol area 111 and Symbol D on the second transparent sheet 122 are not projected on the screen.

The device described above is operated in the following sequence: input of image on the original sheet, extraction and identification of symbols, creation of display image, and image display. These steps are explained below sequentially in the same order.

In the first step wherein image data are inputted, the sheet 110 is placed on the image input table such that the boundary between the symbol area 111 and the display image area 112 of the sheet 110 will approximately coincide with the line marked on the table. One of the switches 103 for activating the device is operated next. When the device is activated, the image input device 106 takes in the image from the sheet 110 and input image data are recorded in the image memory device for input 105.

In the second step, the CPU 101 extracts and identifies the symbols drawn in the symbol area 111. Since the relative positional relationship between the sheet 110 on the table and the image input device 106 is fixed, the area inside the device which corresponds to the symbol area 111 is always the same. Regarding the input image, the CPU 101 creates a histogram of the values of the picture elements in the symbol area 111 and obtains the value of background image elements. Since the background generally occupies the largest fraction of the total image area, it appears as a hill with a large area and high frequency, and the value of background picture elements can be obtained from the position of such a hill. Next, picture elements of the symbol area 111 other than the background are considered and labeled.

Next, each labeled region is investigated and a vertical bar 113 of Symbol A and a rectangular frame 115 of Symbol B are extracted. They can be extracted easily because they are both black and have definite shapes. In the case of Symbol A, if the vertical bar 113 is found, the accompanying circle 114 in a specified color can be found easily in its neighborhood. The red, green and blue values which represent this specified color are determined as the average values of image elements at several different points within this circle 114. In the case of Symbol B, the rectangular frame 115 is extracted first and the red, green and blue values of the specifying color are obtained similarly as the average values of those from a plurality of picture elements selected from the interior 116 of this frame 115. After Symbol B is extracted, a search is made for Symbol D. This is done by adding a margin to the picture element value of Symbol B to determine a range and checking the picture elements of the display image area 112 within this range. It is examined whether four of these picture elements are connected or not. The frame 118 of Symbol D can be extracted by examining whether a region of four connected picture elements is present or not and whether a hole is present in such a region or not. Even if a region with four connected picture elements is found, it is not identified as Symbol D unless a hole is present in this region. If Symbol D is not found, the range of picture element values is expanded slightly and the process is repeated.

Symbol C is drawn at the bottom of the symbol area 111 and the search therefor is made only in this part of the symbol area 111. Although Symbol C has no distinguishing characteristics such as the vertical bar 113 of Symbol A or the rectangular frame 115 of Symbol B, it is easy to extract because only a limited portion of the symbol area 111 has to be scanned.

As a result of the extraction and identification processes described above, vertical coordinates of the upper and lower ends of the vertical bar 113 and color (three values for red, green and blue) are obtained in the case of Symbol A, color (three values) in the case of Symbol B or Symbol C, and the coordinates of all picture elements of the symbol in the case of Symbol D are obtained. These data are stored in the memory devices 102 and 105.

In the next step, the data thus stored in the memory devices 102 and 105 are processed in specified manners and display image data are created in the image memory device for display 107. For this process the three look-up tables are first initialized. This is done by entering a value "a" at Address "a" and setting the tables such that the values of the image memory device for display 107 do not change by the look-up tables but directly become picture element values. Next, a value "i" to be explained below is entered in all three frames of the memory device 103 and the content of the Address "i" of the look-up tables is changed to the value for the display of the background of the display image area of the input image. Accordingly, picture elements with the value "i" are displayed in this background color.

Symbol C is processed next. For this process, a value "j" to be explained below is entered in all picture elements of the three frames of the memory device 107 and the value of specified color of Symbol C is entered at Address "j" of their look-up tables. Similarly, as a result, picture elements with the value "j" are displayed in the color specified by Symbol C. If Symbol C is not present, this process is omitted.

Next, Symbol A is processed. The input image on the left-hand side of the vertical bar 113 of Symbol A is checked first to determine the positions of characters, etc. and the coordinates of a rectangle which will surround them are determined. Since the upper and lower ends of the vertical bar 113 of Symbol A are already known from the time when Symbol A was extracted, only the horizontal extension of this rectangle must be determined. Within the vertical extension determined by the vertical bar 113 of Symbol A, non-background picture elements having different values are considered, it being assumed that the picture element value for the background is already known. This value can be determined, for example, by a method of making a histogram as described above and selecting a value with high frequency. Alternatively, it may be determined from a picture element at a position, such as one near an edge, where characters and figures are not drawn or where it has been determined that nothing has been drawn.

Next, regions of 8 connected non-background picture elements are considered. Regions which are smaller than a predetermined size are eliminated as noise and only larger regions are considered as parts of a character, etc. and the coordinates of the left-hand and right-hand ends of a rectangle are determined such that all characters, etc. thus determined are contained inside this rectangle. The coordinate of the left-hand end of this rectangle is determined by finding the region of 8 connected picture elements at the farthest left-hand side and by moving to the left by a specified distance from the position of the picture element at the left-hand end of this region at the furthest left. Similarly, the coordinate of the right-hand end of the rectangle is determined by finding the region of 8 connected picture elements at the farthest right-hand side and moving to the right by another specified distance from the position of the picture element at the right-hand end of this region at the farthest right. Thus, the rectangle determined by these coordinates of the left-hand end and the right-hand end and by the coordinates of the upper and lower ends of the vertical bar of Symbol A represents the region to be filled in, and the corresponding rectangular area of the memory device 107 is filled. This is done by writing a value "k" to be explained below in the picture elements of the rectangular area of the three frames of the image memory device for display 107 and such value that will display the color specified by Symbol A is written at Address "k" of the look-up table of each frame. Any rectangular area with the value "k" written therein is thereby displayed on the display image in the color specified by Symbol A. If Symbol A is present elsewhere, the same process is also carried out there although the value of "k" is different. After all Symbols A are processed, Symbols B and D are processed next.

For processing Symbols B and D, the frame 118 of Symbol D is first copied in the image memory device for display 107 but the value "m" for the picture elements of the image memory device 107 must be different from any of the values already written in the image memory device 107. After the frame 118 is copied with "m" as the value of the picture elements, this is used as a closed boundary and its interior is filled with the value "m". After this is done for all three frames, a value is written at Address "m" of the three look-up tables such that a display is made in the color specified by Symbol B. As a result, the area indicated by Symbol D is displayed in the color specified by Symbol B. Other Symbols B and D which may be present are processed similarly. This can be accomplished easily because symbols of the same color are considered together. Each Symbol B may be made to correspond to a plurality of Symbols D.

After the symbols are all processed, an image with specified areas filled in specified colors is created in the image memory device for display 107. Thereafter, the portion of the input image in the display image area 112 is copied from the memory device for input 105. This is done by excluding picture elements for the background and Symbol D from those forming the image in the display image area 112 and substituting the remainder thus obtained into the corresponding picture elements in the memory device for display 107. For this process, the picture elements corresponding to the background can be identified by the background value and the picture elements corresponding to Symbol D are already identified. In other words, the copying process described above is for copying the characters and figures drawn in the display image area 112 other than Symbol D onto the image having colored areas and created by the processes specified by the symbols in the symbol area 111. If a value to be entered into the memory device for display 107 is the same as "i", "j", "k" or "m" introduced above, such value is replaced by another relatively similar value. This is done because the picture element values which are used in the processing of the symbols give rise to a display different from the input display regarding color and brightness since the contents of the look-up tables are changed by such picture element values.

The aforementioned values "i", "j", "k" and "m" are codes for specifying colors of regions in the image and the image is displayed in the display colors at the addresses in the look-up tables specified by these codes. Since regions with the same code assigned thereto are all displayed in the same color, different codes must naturally be assigned to regions which are to be displayed in different colors, and, in particular, "i", "j", "k" and "m" are different values. Regions specified by Symbols D of the same color may be assigned different values. The values "i", "j", "k" and "m" may correspond to different brightness and color values not used in the display image such as the background color. Alternatively, of the available values 0–255, a sequence such as 0, 10, 20, 30, . . . may be used. In the latter case, if a brightness level which has already been used for example is needed, it is substituted by another at a similar brightness level.

Figure 20:
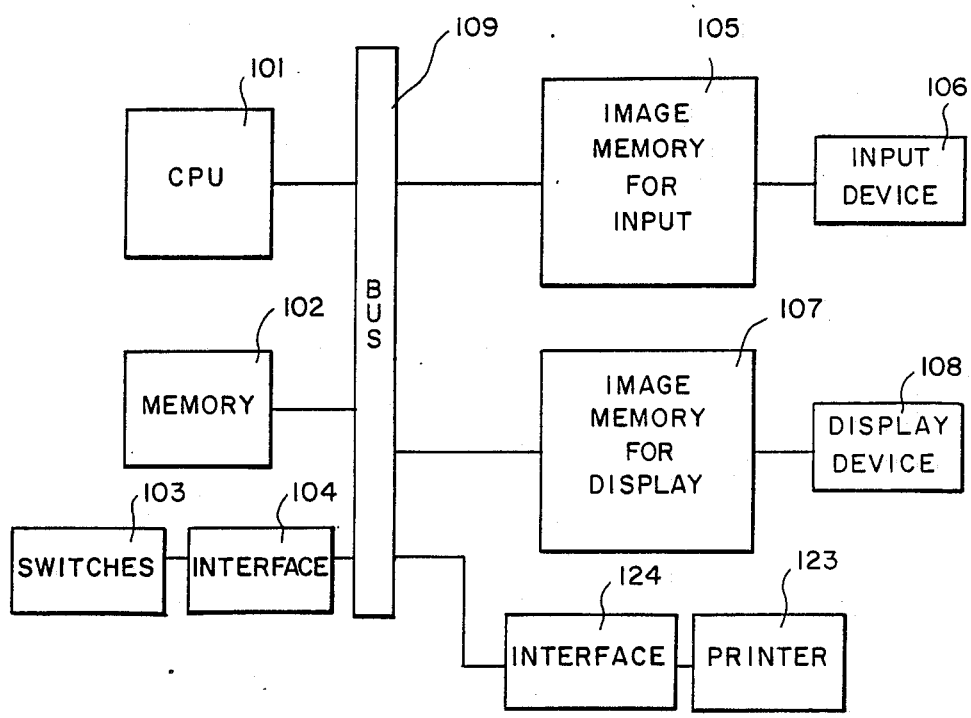
FIG. 20 is a block diagram of still another device embodying the present invention.

FIG. 20 is a block diagram of another device only slightly modified from the device described above by way of FIGS. 11–19. Components which are identical or similar to those shown in FIG. 11, therefore, are indicated by the same numerals. The device of FIG. 20 is characterized by a printer 123 connected through another interface 124 such that an image to be displayed by the display device 108 can be printed out. The printer 123 is of a thermal transfer type with color printing capability in yellow, magenta, and cyanic each in 64 steps. The CPU 101 in this case converts the contents of the memory device for display 107 into data for the printer 123 and sends these data to the printer 123 through the interface 124. The printer 123, thus activated, can print out the same image as the display image. Advantages of devices of the type described above by way of FIG. 11–20 include reducing the trouble involved in preparing an original because the device can be operated to carry out appropriate image processing such as coloring simply by adding a simple symbol to the original sheet on which characters, etc. to be displayed are drawn. Since display data such as characters to be displayed and symbols for specifying the processing to be performed thereon can be entered at the same time, these devices can be operated more easily than if commands had to be entered in a successive manner. Moreover, since only simple symbols are used to indicate the needed image processing and such symbols can be manually drawn, there is no need for a separate device for entering such commands.

Figure 21:
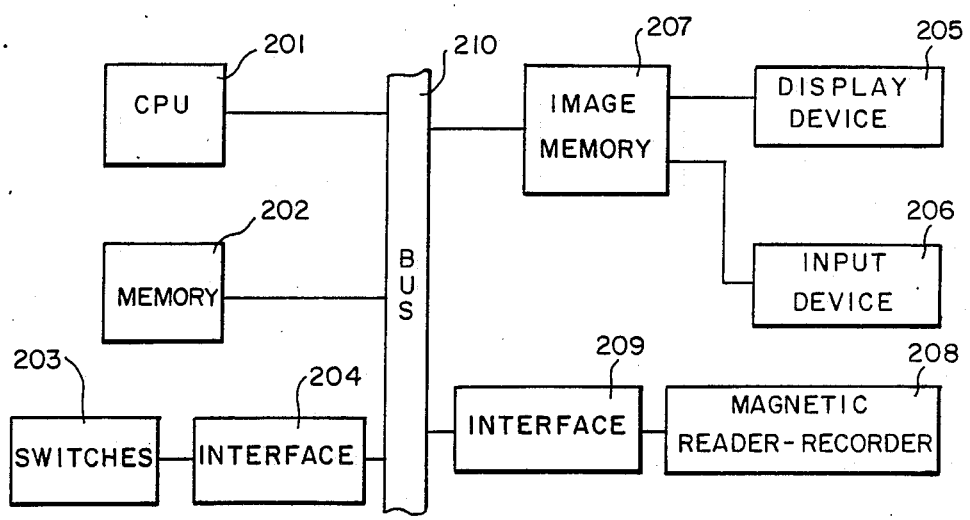
FIG. 21 is a block diagram of still another device embodying the present invention.

Another device which is still to be considered as embodying the present invention is described next by way of FIGS. 21-26. This device comprises, as shown in FIG. 21, a CPU 201 for controlling the overall operation of the device and also for performing digital image processing, a memory device 202 for storing programs and data for the CPU 201 and also serving as a data area, operating switches 203 for controlling basic operations such as starting and ending the input of an image and accepting data from an original, an interface 204 connected to the switches 203, an image memory device 207 for storing image data processed by the CPU 201, and image display device 205 for displaying image data stored in the image memory device 207, an image input device 206 for receiving display image data from an original sheet 211 (shown in FIG. 22), a magnetic reader-recorder 208 for reading commands recorded on the original 211 and another interface connected to this magnetic reader-recorder 208. Both data to be displayed and command data are recorded on the original sheet 211. Of the components described above, a memory device 202, the interfaces 204 and 209 and the image memory device 207 are connected to the CPU 201 through a bus 210. Alternatively, the system may be provided with a separate hardware component for image processing.

As explained above in, connection with the image display device 205, the display device may also comprise a color CRT monitor. A plurality of such color CRT monitors or a projector with a large screen size, say, of 100 inches may be used when the display image is to be shown to a large number of persons. Similarly, the image input device 206 may comprise a camera or a one-dimensional charge coupled device (CCD) line sensor. Unlike the original sheet 110 described above, the original sheet 211 to be used in connection with the device of FIG. 21 is characterized in that command data are recorded thereon by a magnetic recording method. Thus, the magnetic reader-recorder 208 comprises a magnetic card reader or the like.

According to one embodiment of the present invention, the original sheet 211 has the size of approximately 200 mm × 300 mm and, as shown in FIG. 22, consists of an image data recording section 212 and a command data recording section 213. The image data recording section 212 is a section where characters, figures, etc. can be written or printed thereon and the image of the recorded data thereon is received by the input device 206. Such an image may be a binary (two-value) image or may be colored, including different levels of brightness. The command data recording section 213 is a belt-like elongated area along an edge of the sheet 211 and is prepared, for example, by coating it with a magnetic recording medium. Command data recorded in this section are adapted to be read by the magnetic reader-recorder 208. The command data may include those for specifying which of the available processes is to be performed on a retrieved image, those for specifying image elements and regions which are to be processed, and also those for specifying a color, an extent of processing, etc. A plurality of processes may be specified at the same time.

Types of image processing include sharpening of the image, conversion into a binary image, changes in shading, coloring of a region, changing of colors, broadening and thinning of lines, conversion into bold-faced letters, increasing in contrast, flashing (or blinking), drawing of a figure, enlargement of a portion, trimming of a portion, hatching of a region by repeating a pattern, technamation display, coloring of the background, etc. Technamation is a method of display for showing the motion of an object or a flow within a region. A polarization plate may be used with an overhead projector for such a display. Algorithms for these types of image processing are well known.

Figure 23A:
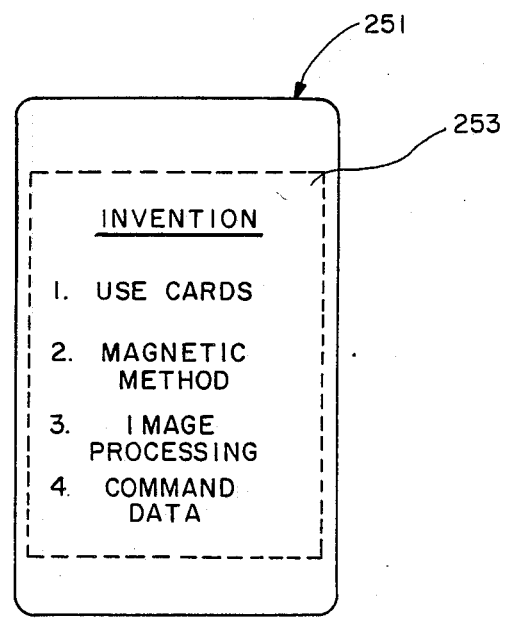

The original sheet 211 described above and shown in FIG. 22 is by no means the only type of data recording medium for use according to the present invention. FIGS. 23(a) and 23(b) show a magnetic card 251 which may serve the purpose of the present invention equally well with its back surface provided with a command data recording section 252 as shown in FIG. 23(b) and its front surface having a display data recording section 253 as shown in FIG. 23(a). Moreover, the present invention is not limited to the use of magnetic means for recording and reading data. Methods by bar codes, the likes of mark cards, punched holes and optical means based on optical character recognition, for example, may be utilized.

Figure 24:
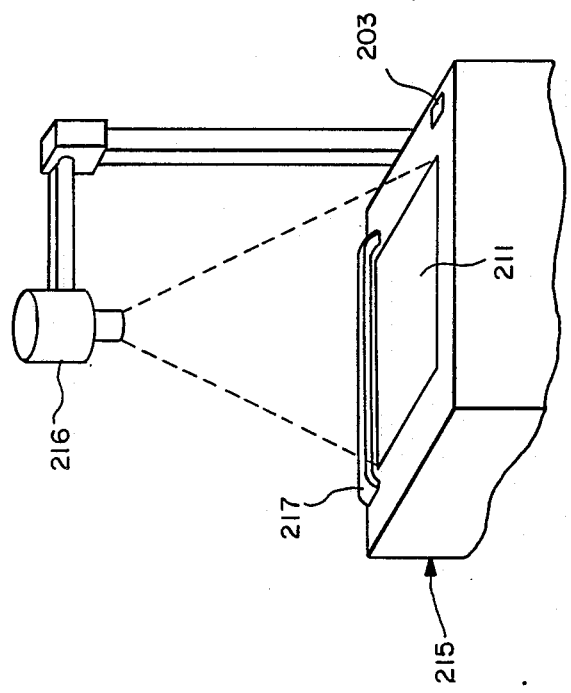
FIG. 24 is a perspective view of an image display device embodying the present invention.
Figure 25:
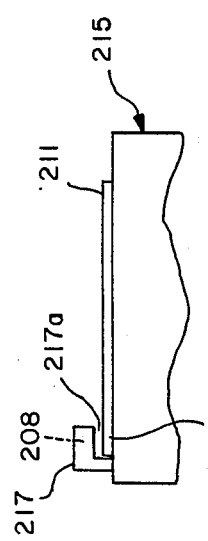
FIG. 25 is a side view of a part of the device of FIG. 24.

FIG. 24 shows an example of device for reading data from a sheet 211 of the type shown in FIG. 22. A camera 216 is provided as an example of the image input device 206 of FIG. 21 supported above a table which is an example of the image input table described above in connection with another embodiment of the present invention. The table 215 is provided not only with the operating switches 203 described above but also with a supporting member 217 for the magnetic reader-recorder 208 for reading data from the command data recording section 252 of the original sheet 211. As shown in FIG. 25, this supporting member 217 containing the magnetic reader-recorder 208 is formed with a groove 217(a) into which the command data recording section 253 of the sheet 211 is adapted to be inserted. The magnetic reader-recorder 208 may be adapted to be driven by a motor or the like to move along the command data recording section 253 and to thereby read the data thereon. Alternatively, the magnetic reader-recorder 208 may be affixed to the supporting member 217 and the sheet 211 is moved manually to have the data thereon read by the stationary magnetic reader-recorder 208.

Figure 26:
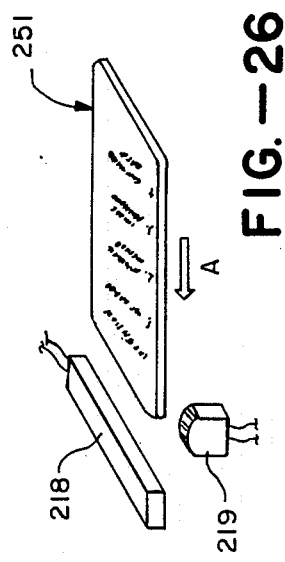
FIG. 26 is a perspective view of a part of an image data display device for the magnetic card shown in FIG. 23.

FIG. 26 shows an example of device for reading data from a magnetic card 251 of the type shown in FIGS. 23(a) and 23(b), having a one-dimensional CCD line sensor 218 for reading the display data from the front surface of the magnetic card 251 and a magnetic reader head 219 representing the magnetic reader-recorder 208 of FIG. 21 for reading commands from the command data recording section 252 on the back surface of the magnetic card 251. The magnetic card 251 is adapted to be inserted into the data reading device of FIG. 26 through an inlet (not shown) and to be transported in the direction of the arrow A thereupon having the display and command data read as explained above.

With a device thus structured, the reading of display and command data on the sheet 211 is started by the input device 206 and the magnetic reader-recorder 208 when an appropriate one of the operating switches 203 is operated. The input image according to the display data read by the input device 206 is stored in the image memory device 207, and digital image processing including modifications and alterations is effected thereon by the CPU 201 according to the commands received from the magnetic reader-recorder 208. As a result, the image by the display data corresponding to the display data is improved and displayed in the display device 205.

Let us assume, as an example, that it is desired to display a certain region in the display image uniformly in one color. Since coloring is effected by a digital image processing method according to the present invention, the brightness level of all picture elements in this region can be made equal, that is, the given region can be displayed with completely uniform coloring. Since image conversions can be effected also by digital image processing, it is possible to change a display image dynamically by using this display device 205. For example, characters and figures in a certain region can be made to blink. Thus, displays in red and blue may be made alternately at a selected period such as one second. Since display data are recorded on a recording medium according to the present invention either as a printed image or as a drawing, data can be stored easily without increasing the memory capacity of such a medium even if the display image is complicated or has different shades of colors. With a device adapted to convert image data into digital symbols for recordation, for example, its recording medium may frequently turn out to be too small for containing all received data because a large amount of data is usually required for each picture element if the image comprises different shades of colors. Disadvantages of this kind are not shared by the devices described above.

It now goes without saying that many variations can be made within the scope of the present invention over the device described above. Although one set of display data and one set of command data corresponding thereto are recorded on one data recording medium according to the example presented above for illustration, a large memory device may be provided within the device instead such that data on a plurality of such recording media can be preliminarily stored thereon. Alternatively, the system may be so arranged that more than one set of display data can be on a single recording medium.

Advantages of this embodiment of the present invention include the ability to change the display image dynamically while it is being displayed since image conversion is effected by a method of digital image processing. For example, the user can easily indicate a point of interest in the displayed image to attract the viewer's attention thereto. Another advantage is, as mentioned immediately above, that even data corresponding to a complicated image can be reliably recorded without requiring an increased capacity of its recording medium.

Figure 27:
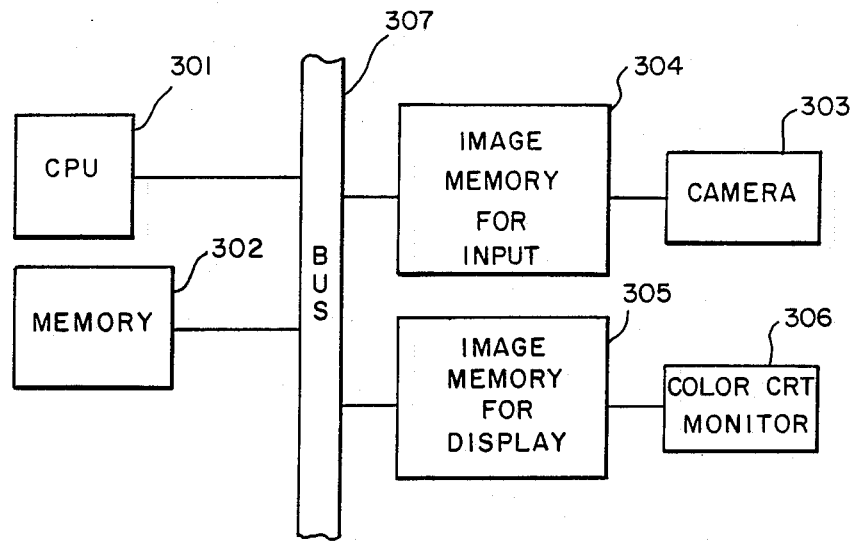
FIG. 27 is a block diagram of still another device embodying the present invention.

Still another device to be considered as embodying the present invention is described next by way of FIGS. 27-34. As schematically shown in FIG. 27, this device comprises a CPU 301 for controlling the overall operation of the device and performing digital image processing, etc., a memory device 302 for storing programs and data for the CPU 301 and serving as a data area, a camera 303 serving as image input means for receiving from an original sheet 308 shown in FIG. 28 an input image in the form of display data and command symbols, an image memory device for input 304 for storing as input image data the values of picture elements received by this camera 303, an image memory device 305 which stores display image data processed by the CPU 301, and a color CRT monitor 306 serving as image display means for displaying display image data from the memory device 305 as a display image. The memory devices 302, 304 and 305 are connected to the CPU 301 through a bus 307. Switches (not shown) are also connected to the CPU 301 for performing basic operations such as starting, stopping and ending the reading of an image.

Among the functions of the CPU 301 are extraction and identification of command symbols 309 recorded on the original sheet 308, digital image processing for performing image conversions on input image data, successive performance of image processing on input image data according to whether a command symbol 309 is received by the camera 303 or the symbol 309 is covered and there is no input to the camera 303, etc. What is to be done specifically by way of image processing is preliminarily defined by the command symbols 309, etc. on the sheet 308. For example, it may be so programmed that, if such a symbol 309 is obstructed, the character array etc. on the left-hand side of the symbol is surrounded by a red rectangle. The processing to be carried out if a symbol is covered, the area on the sheet 308 where display data may be recorded, etc. are preliminarily given as data to the CPU 301. Such data may be supplied alternatively by a floppy disc or by symbols of a different design on the sheet 308. Image processing is not limited to the coloring a region. Moving a region, enlargement, contraction, increasing contrast, flashing, erasure, etc. may be effected by image processing. Algorithms for such image processing are well known.

The image memory device for input 304 has the capability of accepting images continuously. A plurality of color monitors 306 may be provided when the display is to be viewed by many persons. Alternatively, a projector with a large screen size such as 100 inches may be substituted. Instead of a camera 303, a one-dimensional CCD line sensor may be used as the image input device.

Figure 28:
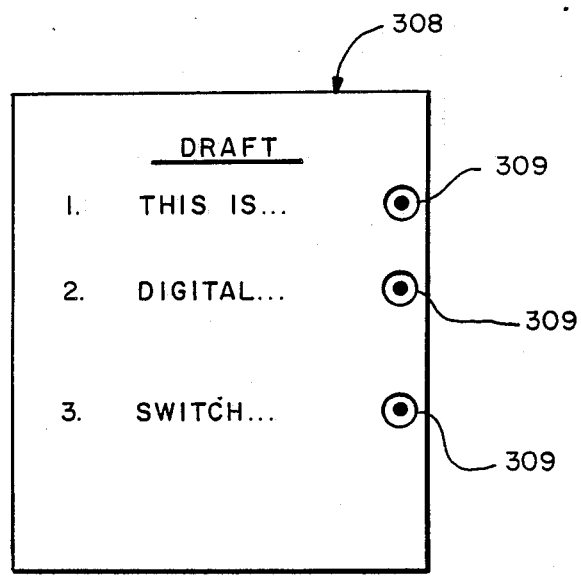
FIG. 28 is a drawing showing an example of input data on a sheet to be used with the device shown in FIG. 27.

As shown in FIG. 28, command symbols 309 are recorded on the right-hand edge of the sheet 308 and display data are entered into the area on the left. The command symbol 309 consists of, for example as shown in FIG. 29, of a circle 309a and a circular ring 309b around it. The outer diameter of the ring 309b is preferably about 10 mm if the image of display data is about 200 mm × 200 mm in size and this image is to be inputted through 512 × 512 picture elements because a symbol of this size can be entered clearly enough for extraction and identification. Thus, the design of a command symbol must be so selected as to be easily extracted and identified. Such symbols may be drawn by hand or recorded by using a template or a stamp. Approximate positions for recording these symbols are preliminarily determined.

FIG. 30 shows an example of image input device for reading data from the sheet 308 with the camera 303 supported over a table 310 on which the sheet 308 is placed. Surrounding the area where the sheet 308 is to be placed, there are a plurality of fastening pieces 311 provided as shown in FIG. 31 to prevent the sheet 308 from moving. Additionally, there is provided on the table 310 an arrow-shaped non-transparent cover plate 312 as shown in FIG. 32. This cover plate 312 can be used not only for hiding a command symbol 309 to thereby prevent its image from being inputted into the camera 303 but also for indicating the position of a display image. It goes without saying that it is not necessary to use any plate like this to cover the symbol 309. A finger, a hand, a pencil, etc. may be used for this purpose.

Figure 33:
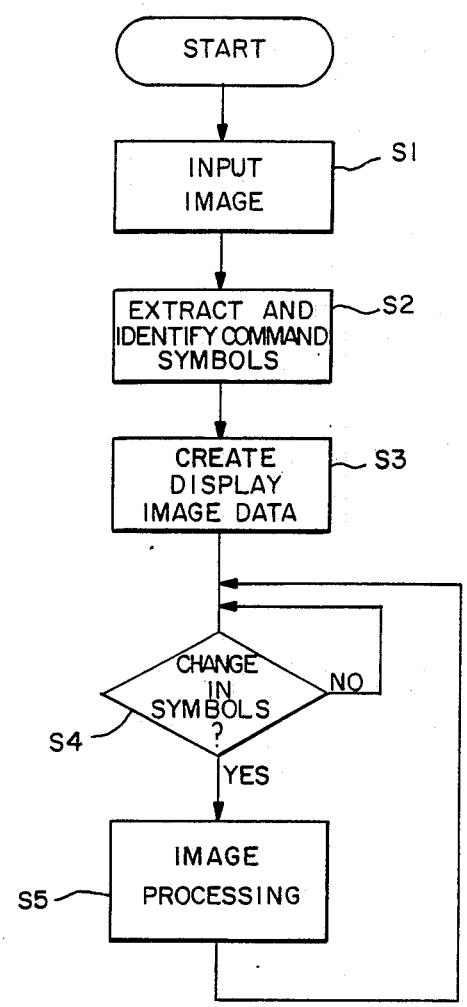
FIG. 33 is a flow chart of the operation of the image display device of FIG. 30, and FIGS. 34(a)-34(c) are drawings showing displays obtainable from the sheet of FIG. 28.

Operation of the device described above is explained next by way of the flow chart of FIG. 33. First, the original sheet 308 is set on the table 310 and is fastened by the pieces 311. When an operating switch is operated, the display data and command symbols 309 on the sheet 308 are taken in by the camera 303 as input image (S1) and stored in the image memory device for input 304. Next, the CPU 301 extracts and identifies the command symbols 309 from the input data stored in the memory device 304 (S2). Since the design and approximate positions of the command symbols 309 are determined in advance the symbol design is to be easily extractable and identifiable, Step S2 can be executed easily, for example, by a template matching method, and a list of types and coordinates of all command symbols 309 included in the input image data is obtained. Thereafter, the CPU 301 excludes from the input image data recorded in the memory device 304 the command symbols 309 which have been extracted and identified in Step S2 and records the result in the memory device 305 as display image data (S3). The display image data thus recorded are the data obtained as a result of the image processing corresponding to the command symbols 309 and are displayed in the color CRT monitor 306 as display data. This display is continued until the operation of the device is terminated. During this time, preparations are made for the image processing to be performed later in Step S5.

In the meantime, the camera 303 continues to receive the image of the sheet 308, monitoring whether the same symbols 309 continue to be seen at the coordinates earlier recorded in the memory device 304. In other words, the camera 303 keeps monitoring whether any of the command symbols 309 which has been visible does not disappear and whether any of them which has been hidden does not become visible (S4). This monitoring process, too, can be carried out easily by a template matching method or the like. With the sheet 308 fastened on the table 301 so that it does not move with respect to the camera 303, Step S4 is continued as long as there is no appearance or disappearance of any command symbols 309. If there is a change, image processing is carried out on the input image data stored in the image memory device 305 corresponding to the command symbol 309 which appeared or disappeared, and the resultant image is displayed in the color CRT monitor 306. If the three command symbols 309 in FIG. 31 (one hidden by the arrow 312 and two remaining visible) are sequentially covered by the plate 312 from the top one, the corresponding display will change as shown in FIGS. 34(a), 34(b) and 34(c), that is, a red rectangle will appear and surround the character areas one at a time. For example, if the command symbol at the top is covered as shown in FIG. 31, the display will be as shown in FIG. 34(a), emphasizing the first item to the viewers. Since this is a kind of switching operation, the process returns to Step S4 as soon as the processing of Step S5 is completed. The entire operation of Steps S1–S5 can be terminated as an interrupt by an operating switch.

The present invention has been described above by way of only a limited number of illustrative examples. Any modifications and variations thereon that may be apparent to a person skilled in the art are also intended to be included within the scope of this invention.

What is claimed is:

1. A device for editing and displaying an image comprising
  a data recording medium for recording both display data and command data which specify image processing of said display data, said data recording medium including an original sheet for recording thereon display command symbols adapted to specify display conditions such as shape, color and position on said display means, said display command symbols including a bar for indicating a direction and a distance, a colored circle for indicating a specified color, and a frame for indicating an area,
  image input means for receiving said display data from said data recording medium as an input image composed of picture elements,
  memory means for recording the values of said picture elements,
  command data reading means for reading said command data from said data recording medium, said image input means and said command data reading means forming a single input unit adapted to receive as said input image both said display data and said display command symbols,
  digital image processing means for performing digital image processing on image data recorded in said memory means according to said command data read by said command data reading means, said digital image processing means being also adapted to extract and identify input image data in said memory means corresponding to said display command symbols and to perform digital image processing on said image data according to commands represented by said display command symbol, and
  display means for displaying as an image said image data processed by said digital image processing means.

2. A device for editing and displaying an image comprising
  a data recording medium for recording both display data and command data which are recorded as command symbols and specify image processing of said display data, said data recording medium including an original sheet with a specified surface area thereof reserved for drawing said command symbols thereon,
  image input means for receiving said display data from said data recording medium as an input image composed of picture elements, said image input means including a camera and a non-transparent covering means for successively covering said command symbols,
  memory means for recording the values of said picture elements,
  command data reading means for reading said command data from said data recording medium, said image input means and said command data reading means forming a single input unit adapted to receive as an input image both said display data and said command symbols, digital image processing means for performing digital image processing on image data recorded in said memory means according to said command data read by said command data reading means, said digital image processing means being adapted to extract and identify input image data in said memory means according to said command symbols, and to perform digital processing on input image data of said display data according to commands represented by said command symbols, said digital image processing means including detecting means for successively detecting whether extracted and identified ones of said command symbols are inputted or not by said input unit, said digital image processing means being further adapted to perform said image processing according to the result obtained by said detecting means, and display means for displaying as an image said image data processed by said digital image processing means.

3. The device of claim 2 wherein said command symbols include a geometrical figure with circular symmetry.

4. The device of claim 2 wherein said command symbols include a pair of mutually concentric circles.

5. A device for editing and displaying an image including an image editing device and an image display device, said image editing device comprising a data creating means for creating data of a code array obtained by selectively arranging in the order of execution those of a plurality of simplified figure codes corresponding to figure elements and a plurality of simplified process codes for specifying processing of said figure codes, and and exchangeable non-volatile external memory means for recording said data created by said data creating means, and said image display device comprising data reading means for retrieving data recorded in said non-volatile external memory means, data processing means for creating image data of a display image composed of picture elements by interpreting codes in data retrieved by said data reading means and executing said according to said code array, image memory means for recording the value of each of said picture elements of said display image, and display means for displaying image data recorded in said image memory means in the form of an image.

6. The device of claim 5 wherein said figure codes include codes for drawing geometrical figures like points, straight lines, rectangles and ellipses.

7. The device of claim 5 wherein said process codes include codes for specifying speeds at which figures are drawn by said display means.

8. The device of claim 5 wherein said external memory includes a floppy disk device.

9. The device of claim 5 wherein said display means comprise one or more projectors.

* * * * *